United States Patent
Ren et al.

(10) Patent No.: US 12,526,666 B2
(45) Date of Patent: Jan. 13, 2026

(54) CLI MEASUREMENT ENABLED WITH AoA ESTIMATION

(71) Applicant: QUALCOMM Incorporated, San Diego, CA (US)

(72) Inventors: Yuwei Ren, Beijing (CN); Weimin Duan, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 18/003,068

(22) PCT Filed: Sep. 4, 2020

(86) PCT No.: PCT/CN2020/113471
§ 371 (c)(1),
(2) Date: Dec. 22, 2022

(87) PCT Pub. No.: WO2022/047732
PCT Pub. Date: Mar. 10, 2022

(65) Prior Publication Data
US 2023/0262493 A1    Aug. 17, 2023

(51) Int. Cl.
*H04W 4/00*    (2018.01)
*G01S 5/00*    (2006.01)
(Continued)

(52) U.S. Cl.
CPC ........... *H04W 24/08* (2013.01); *G01S 5/0036* (2013.01); *H04B 17/328* (2023.05); *H04L 5/0048* (2013.01)

(58) Field of Classification Search
None
See application file for complete search history.

(56) References Cited

U.S. PATENT DOCUMENTS

| 10,477,340 B2 | 11/2019 | Edge et al. |
| 2011/0228711 A1 | 9/2011 | Du et al. |

(Continued)

FOREIGN PATENT DOCUMENTS

| CN | 102257747 A | 11/2011 |
| CN | 102281543 A | 12/2011 |

(Continued)

OTHER PUBLICATIONS

LG Electronics: "Discussion on CLI Performance Test Cases", 3GPP TSG-RAN WG4 Meeting #94-e-Bis, R4-2003223, 3rd Generation Partnership Project, Mobile Competence Centre, 650, Route Des Lucioles, F-06921 Sophia-Antipolis Cedex, France, vol. RAN WG4, No. Online Meeting, Apr. 20, 2020-Apr. 30, 2020, Apr. 10, 2020, 4 Pages, XP051871875, p. 3 lower half.

(Continued)

*Primary Examiner* — Zewdu A Beyen
(74) *Attorney, Agent, or Firm* — Thien T. Nguyen

(57) ABSTRACT

This disclosure provides systems, methods, and apparatuses, including computer programs encoded on computer storage media, for wireless communication. In one aspect of the disclosure, a method for wireless communication performed by a user equipment (UE) includes receiving cross-link interference (CLI) resource configuration information and angle-of-arrival (AoA) estimation configuration information, The method also includes receiving CLI associated with an uplink transmission transmitted by another UE, and determining a CLI value for the CLI based on the CLI resource configuration information. The method includes determining an AoA value associated with the CLI based on the AoA estimation configuration information, the AoA value corresponding to an estimated AoA at the UE associated with the uplink transmission. The method further includes transmitting CLI report data indicating the deter- (Continued)

mined CLI value and AoA report data indicating the estimated AoA value. Other aspects and features are also claimed and described.

35 Claims, 9 Drawing Sheets

(51) Int. Cl.
*H04B 17/318* (2015.01)
*H04L 5/00* (2006.01)
*H04W 24/08* (2009.01)

(56) References Cited

U.S. PATENT DOCUMENTS

| | | | |
|---|---|---|---|
| 2012/0142328 A1 | 6/2012 | Awoniyi et al. | |
| 2012/0165037 A1 | 6/2012 | Bull et al. | |
| 2013/0303199 A1 | 11/2013 | Siomina | |
| 2016/0014791 A1 | 1/2016 | Liu et al. | |
| 2016/0072562 A1* | 3/2016 | Onggosanusi | H04B 7/0479 370/329 |
| 2018/0205427 A1* | 7/2018 | Ghosh | H04W 24/08 |
| 2019/0199457 A1* | 6/2019 | Chopra | H04W 52/42 |
| 2020/0014445 A1 | 1/2020 | Cai et al. | |
| 2020/0037185 A1 | 1/2020 | Ghosh et al. | |
| 2021/0006997 A1* | 1/2021 | Jin | H04W 24/10 |
| 2022/0061117 A1* | 2/2022 | Liou | H04W 76/19 |

FOREIGN PATENT DOCUMENTS

| | | | |
|---|---|---|---|
| CN | 104350779 A | 2/2015 | |
| CN | 109151888 A | 1/2019 | |
| WO | WO-2012091855 A1 | 7/2012 | |
| WO | WO-2013002825 A2 | 1/2013 | |
| WO | WO-2019027540 A1 | 2/2019 | |
| WO | WO-2020164126 A1 | 8/2020 | |
| WO | WO-2022015031 A1 * | 1/2022 | H04B 17/318 |

OTHER PUBLICATIONS

Supplementary European Search Report—EP20951976—Search Authority—Munich—Jul. 5, 2024.
Supplementary Partial European Search Report—EP20951976—Search Authority——May 16, 2024.
Huawei, et al., "Discussion On AoA Setup for CLI Test Cases", 3GPP TSG-RAN WG4 Meeting #95-e, R4-2007827, Electronic Meeting, May 25-Jun. 5, 2020, pp. 1-2.
Huawei, et al., "Discussion on Remaining Issues in RSS Measurement," 3GPP TSG-RAN WG4 Meeting #94bis-e, R4-2004342, Apr. 20-30, 2020, (Apr. 30, 2020), sections 2-3, 4 pages.
International Search Report and Written Opinion—PCT/CN2020/113471 —ISA/EPO—Jun. 2, 2021.
LG Electronics: "Discussion on CLI Performance Test Cases", 3GPP TSG-RAN WG4 Meeting# 94-e-Bis, R4-2003223, Apr. 30, 2020 (Apr. 30, 2020), 4 Pages, the whole document.

* cited by examiner

CLI MEASUREMENT ENABLED WITH AoA ESTIMATION

TECHNICAL FIELD

Aspects of the present disclosure relate generally to wireless communication systems, and more particularly, to angle-of-arrival estimation for cross-link interference.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

5G NR communication systems may support cross-link interference (CLI) mitigation techniques and angle-of-arrival (AoA) determination techniques. Regarding cross-link interference mitigation, user equipments (UEs) may receive CLI from each other when the UEs have slot format mismatches. A network, such as a base station thereof, may coordinate CLI measurement and reporting operations to mitigate such CLI interference. For example, a UE which is experiencing CLI may receive CLI configuration information, measure the CLI, and report the CLI back to the network. The network may adjust one or more settings of the network, the UEs, or both, to mitigate the CLI. For example, the base station 105 may adjust the slot format of one of the UE's to reduce or eliminate the CLI between two particular UEs.

Regarding AoA determination techniques, base stations may perform AoA estimation for uplink signals from UEs. The AoA estimation may be used to determine a position of the UE. For example, the estimated AoA value may be used with a range estimation to determine a location of the UE. A base station may perform AoA estimation by allocating a specific resource for AoA measurement. The base station may signal the resource to the UE and monitor the resource to estimate an AoA for an uplink transmission from the UE. The base station may use multiple antenna elements or panels to determine the AoA value. The base station may determine a position of the UE based on the AoA, and then perform additional wireless communications based on the determined position. For example, the base station may adjust a setting or update a beam based on the position of the UE.

However, such dedicated resource allocation for AoA estimation utilizes spectrum resources, which increases network overhead and reduces throughput and latency. For example, a base station dedicating a resource for each UE, along with the associated signaling, increases network management operations and may consume a considerable amount of spectrum and processing resources. Additionally, when UEs are further from the base station an accuracy of the AoA estimation generally decreases. Accordingly, UE position determinations made by the base station decrease in accuracy as the distance between the UE and the base station increases.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for wireless communication performed by a user equipment (UE). The method includes: receiving, from a network entity, cross-link interference (CLI) resource configuration information and angle-of-arrival (AoA) estimation configuration information; receiving CLI associated with an uplink transmission transmitted by another UE; determining a CLI value for the CLI based on the CLI resource configuration information; determining an AoA value associated with the CLI based on the AoA estimation configuration information, the AoA value corresponding to an estimated AoA at the UE associated with the uplink transmission transmitted by the other UE; and transmitting CLI report data indicating the determined CLI value and AoA report data indicating the estimated AoA value.

Another innovative aspect of the subject matter described in this disclosure can be implemented in a UE. The UE includes at least one processor and a memory coupled with the at least one processor and storing processor-readable instructions that, when executed by the at least one processor, is configured to: receive, from a network entity, CLI resource configuration information and AoA estimation configuration information; receive CLI associated with an uplink transmission transmitted by another UE; determine a CLI value for the CLI based on the CLI resource configuration information; determine an AoA value associated with the CLI based on the AoA estimation configuration information, the AoA value corresponding to an estimated AoA at the UE associated with the uplink transmission transmitted by the other UE; and transmit CLI report data indicating the determined CLI value and AoA report data indicating the estimated AoA value.

Another innovative aspect of the subject matter described in this disclosure can be implemented in an apparatus configured for wireless communication. The apparatus includes: means for receiving, from a network entity, CLI resource configuration information and AoA estimation configuration information; means for receiving CLI associated with an uplink transmission transmitted by another UE; means for determining a CLI value for the CLI based on the CLI resource configuration information; means for determining an AoA value associated with the CLI based on the AoA estimation configuration information, the AoA value corresponding to an estimated AoA at the UE associated with the uplink transmission transmitted by the other UE; and means for transmitting CLI report data indicating the determined CLI value and AoA report data indicating the estimated AoA value.

Another innovative aspect of the subject matter described in this disclosure can be implemented in a non-transitory computer-readable medium storing instructions that, when executed by a processor, cause the processor to perform operations including: receiving, from a network entity, CLI resource configuration information and AoA estimation configuration information; receiving CLI associated with an uplink transmission transmitted by another UE; determining a CLI value for the CLI based on the CLI resource configuration information; determining an AoA value associated with the CLI based on the AoA estimation configuration information, the AoA value corresponding to an estimated AoA at the UE associated with the uplink transmission transmitted by the other UE; and transmitting CLI report data indicating the determined CLI value and AoA report data indicating the estimated AoA value.

Another innovative aspect of the subject matter described in this disclosure can be implemented in a method of wireless communication performed by a base station. The method includes: transmitting, to a UE, CLI resource configuration information and AoA estimation configuration information; receiving, from the UE, CLI report data indicating a CLI value for CLI at the UE associated with an uplink transmission transmitted by another UE; receiving, from the UE, AoA report data indicating an estimated AoA value associated with the CLI, the AoA value corresponding to an estimated AoA at the UE associated with the uplink transmission transmitted by the other UE; determining a position of the UE based on the AoA report data; and determining a CLI mitigation adjustment based on the CLI report data, the CLI mitigation adjustment indicative of a configuration associated with the UE to reduce or eliminate the CLI associated with the uplink transmission transmitted by the other UE.

Another innovative aspect of the subject matter described in this disclosure can be implemented in a base station. The base station includes at least one processor and a memory coupled with the at least one processor and storing processor-readable code that, when executed by the processor, is configured to: transmit, to a UE, CLI resource configuration information and AoA estimation configuration information; receive, from the UE, CLI report data indicating a CLI value for CLI at the UE associated with an uplink transmission transmitted by another UE; receive, from the UE, AoA report data indicating an estimated AoA value associated with the CLI, the AoA value corresponding to an estimated AoA at the UE associated with the uplink transmission transmitted by the other UE; determine a position of the UE based on the AoA report data; and determine a CLI mitigation adjustment based on the CLI report data, the CLI mitigation adjustment indicative of a configuration associated with the UE to reduce or eliminate the CLI associated with the uplink transmission transmitted by the other UE.

Another innovative aspect of the subject matter described in this disclosure can be implemented in an apparatus configured for wireless communication. The apparatus includes: means for transmitting, to a UE, CLI resource configuration information and AoA estimation configuration information; means for receiving, from the UE, CLI report data indicating a CLI value for CLI at the UE associated with an uplink transmission transmitted by another UE; means for receiving, from the UE, AoA report data indicating an estimated AoA value associated with the CLI, the AoA value corresponding to an estimated AoA at the UE associated with the uplink transmission transmitted by the other UE; means for determining a position of the UE based on the AoA report data; and means for determining a CLI mitigation adjustment based on the CLI report data, the CLI mitigation adjustment indicative of a configuration associated with the UE to reduce or eliminate the CLI associated with the uplink transmission transmitted by the other UE.

Another innovative aspect of the subject matter described in this disclosure can be implemented in a non-transitory computer-readable medium storing instructions that, when executed by a processor, cause the processor to perform operations including: transmitting, to a UE, CLI resource configuration information and AoA estimation configuration information; receiving, from the UE, CLI report data indicating a CLI value for CLI at the UE associated with an uplink transmission transmitted by another UE; receiving, from the UE, AoA report data indicating an estimated AoA value associated with the CLI, the AoA value corresponding to an estimated AoA at the UE associated with the uplink transmission transmitted by the other UE; determining a position of the UE based on the AoA report data; and determining a CLI mitigation adjustment based on the CLI report data, the CLI mitigation adjustment indicative of a configuration associated with the UE to reduce or eliminate the CLI associated with the uplink transmission transmitted by the other UE.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
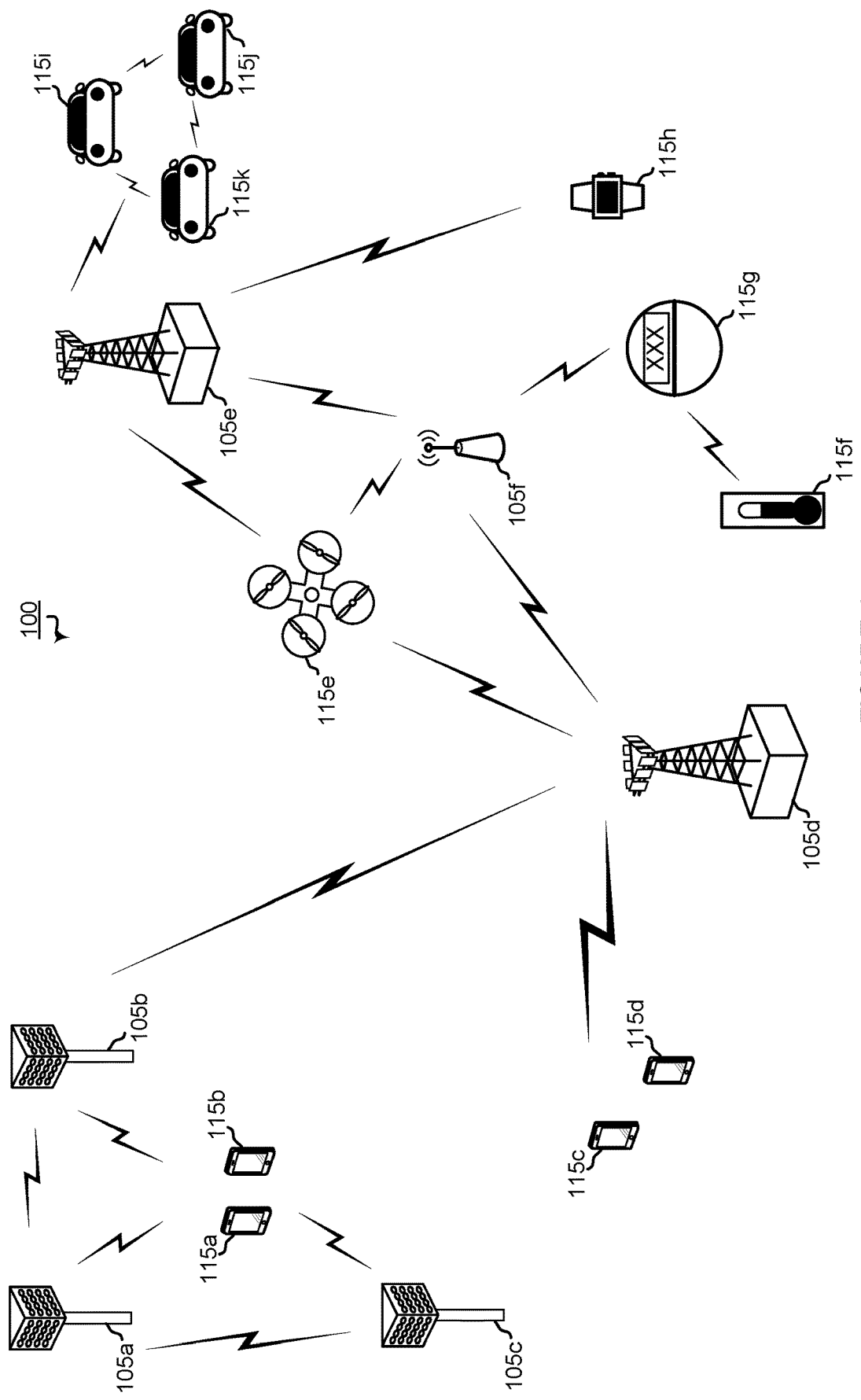
FIG. 1 is a block diagram illustrating details of an example wireless communication system.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The electromagnetic spectrum is often subdivided, based on frequency (or wavelength), into various classes, bands or channels. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band/spectrum in documents and articles, despite being different than the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Various aspects of the present disclosure relate to techniques that enable a user equipment (UE) to estimate an angle-of-arrival (AoA) of a transmission that results in cross-link interference (CLI), and to report AoA and CLI information to another device. In some examples, a UE may determine an AoA based on CLI from transmissions sent by other UEs. In such examples, a UE may receive CLI and AoA configuration information from a base station indicating one or more resources on which the UE is to perform CLI and AoA operations. The UE may then perform CLI measurement operations and AoA estimation operations associated with the CLI to determine CLI and AoA information. For example, the UE may perform measurements on reference signals in the resources indicated by the CLI configuration information and determine a CLI value based on the measurements. The UE may then report the CLI value or other CLI information to various other devices or nodes of a network. For example, the UE may transmit a report that includes the CLI information to the base station, which may then determine CLI mitigation actions, such as change a slot format of the UE, based on the CLI information. Similarly, the UE may perform AoA measurements on reference signals in the resources indicated by the CLI configuration information or the AoA configuration information and determine an estimated AoA value based on the measurements. The UE can use the AoA information, share it with one or more other UEs, report it to the base station or network, or a combination thereof. For example, the UE can transmit a report that includes the AoA information to the base station or an anchor device. The base station or anchor device may then determine a position of the UE or the other UE. To illustrate, the AoA information may be used with range information to determine a position of the device which caused the interference (that is the other UE), a position of the device which received the interference (that is the UE), or both.

Particular implementations of the subject matter described in this disclosure can be implemented to realize one or more of the following potential advantages. In some aspects, the present disclosure provides increased accuracy for device positioning. For example, as UE's which experience CLI from each other may generally be closer to each other than to a base station, UE-to-UE AoA estimations may have increased accuracy as compared network-to-UE AoA estimations. This increased accuracy is especially true for UEs which are near an edge of a coverage area of the base station. Thus, the techniques described herein enable increased granularity for AoA determinations, which may lead to more accurate and precise device positioning estimations. Increased device positioning accuracy and precision may result in an overall better wireless experience. For example, interference and link failures can be reduced and reliability, coverage, and throughput can be increased.

Additionally, in some aspects, the subject matter described in this disclosure can also reduce the processing resources on the network and network overhead. For example, UEs can engage in AoA estimation for other UEs, which may reduce AoA estimation operations at the network. Also, such device-to-device AoA estimation may utilize existing resources, that is CLI resources, for AoA estimation. Utilizing existing resources for AoA estimation reduces signaling and resource allocation as compared to network-based AoA estimation using dedicated resources, which leads to an overall reduction in network overhead.

Moreover, in some aspects, the subject matter described in this disclosure can also enhance device-to-device communications. For example, UEs can utilize AoA estimations to determine the position of other devices for better quality device-to-device communications, line of sight (LOS) propagation, or both.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
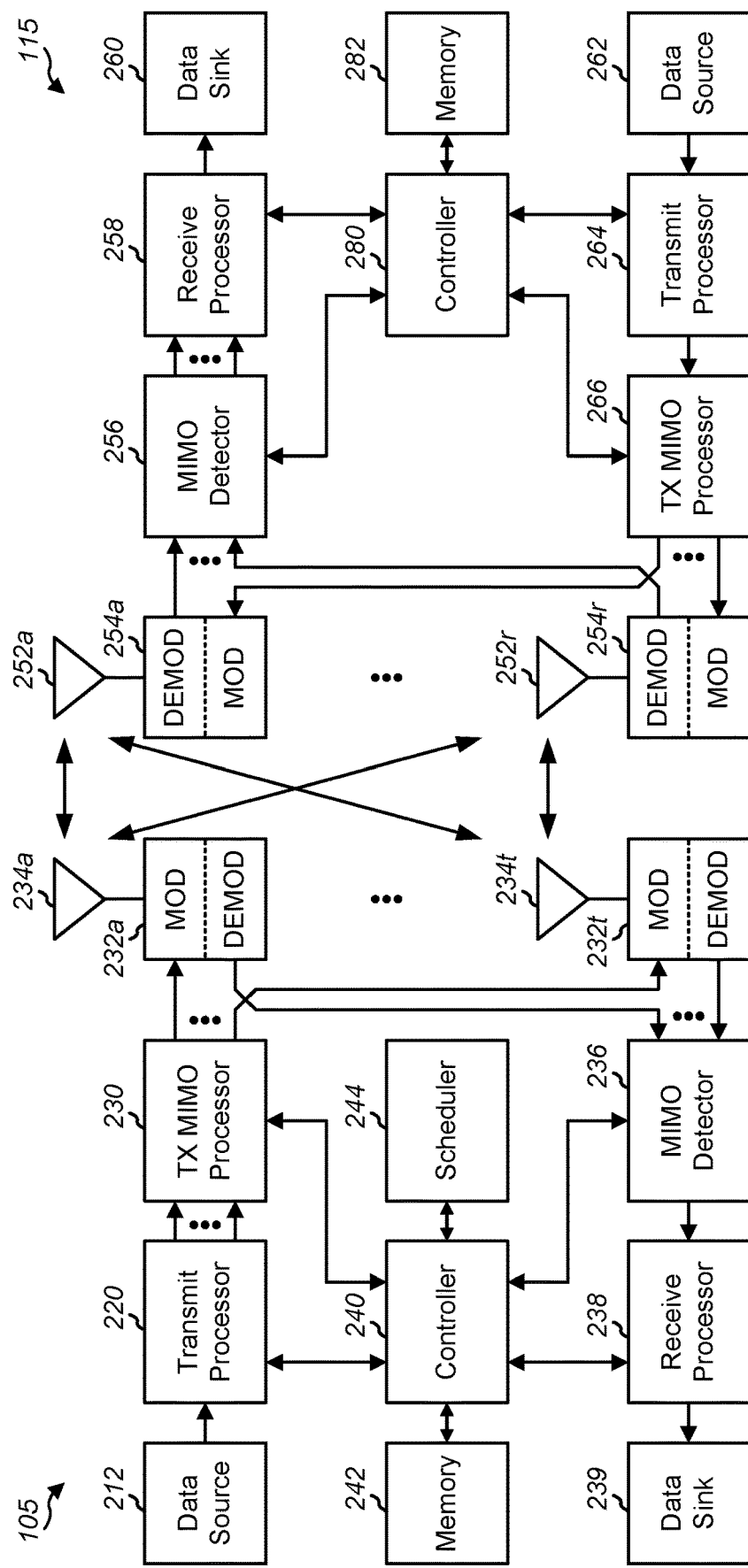
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 4-6, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Various aspects of the present disclosure relate to techniques that enable a UE to estimate an AoA of a transmission that results in CLI, and to report AoA and CLI information to another device. In some examples, a UE may determine an AoA based on CLI from transmissions sent by other UEs. In such examples, a UE may receive CLI and AoA configuration information from a base station indicating one or more resources on which the UE is to perform CLI and AoA operations. The UE may then perform CLI measurement operations and AoA estimation operations associated with the CLI to determine CLI and AoA information. For example, the UE may perform measurements on reference signals in the resources indicated by the CLI configuration information and determine a CLI value based on the measurements. The UE may then report the CLI value or other CLI information to various other devices or nodes of a network. For example, the UE may transmit a report that includes the CLI information to the base station, which may then determine CLI mitigation actions, such as change a slot format of the UE, based on the CLI information. Similarly, the UE may perform AoA measurements on reference signals in the resources indicated by the CLI configuration information or the AoA configuration information and determine an estimated AoA value based on the measurements. The UE can use the AoA information, share it with one or more other UEs, report it to the base station or network, or a combination thereof. For example, the UE can transmit a report that includes the AoA information to the base station or an anchor device. The base station or anchor device may then determine a position of the UE or the other UE. To illustrate, the AoA information may be used with range information to determine a position of the device which caused the interference (that is the other UE), a position of the device which received the interference (that is the UE), or both.

Particular implementations of the subject matter described in this disclosure can be implemented to realize one or more of the following potential advantages. In some aspects, the present disclosure provides increased accuracy for device positioning. For example, as UE's which experience CLI from each other may generally be closer to each other than to a base station, UE-to-UE AoA estimations may have increased accuracy as compared network-to-UE AoA estimations. This increased accuracy is especially true for UEs which are near an edge of a coverage area of the base station. Thus, the techniques described herein enable increased granularity for AoA determinations, which may lead to more accurate and precise device positioning estimations. Increased device positioning accuracy and precision may result in an overall better wireless experience. For example, interference and link failures can be reduced and reliability, coverage, and throughput can be increased.

Additionally, in some aspects, the subject matter described in this disclosure can also reduce the processing resources on the network and network overhead. For example, UEs can engage in AoA estimation for other UEs, which may reduce AoA estimation operations at the network. Also, such device-to-device AoA estimation may utilize existing resources, that is CLI resources, for AoA estimation. Utilizing existing resources for AoA estimation reduces signaling and resource allocation as compared to network-based AoA estimation using dedicated resources, which leads to an overall reduction in network overhead.

Moreover, in some aspects, the subject matter described in this disclosure can also enhance device-to-device communications. For example, UEs can utilize AoA estimations to determine the position of other devices for better quality device-to-device communications, LOS propagation, or both.

Figure 3:
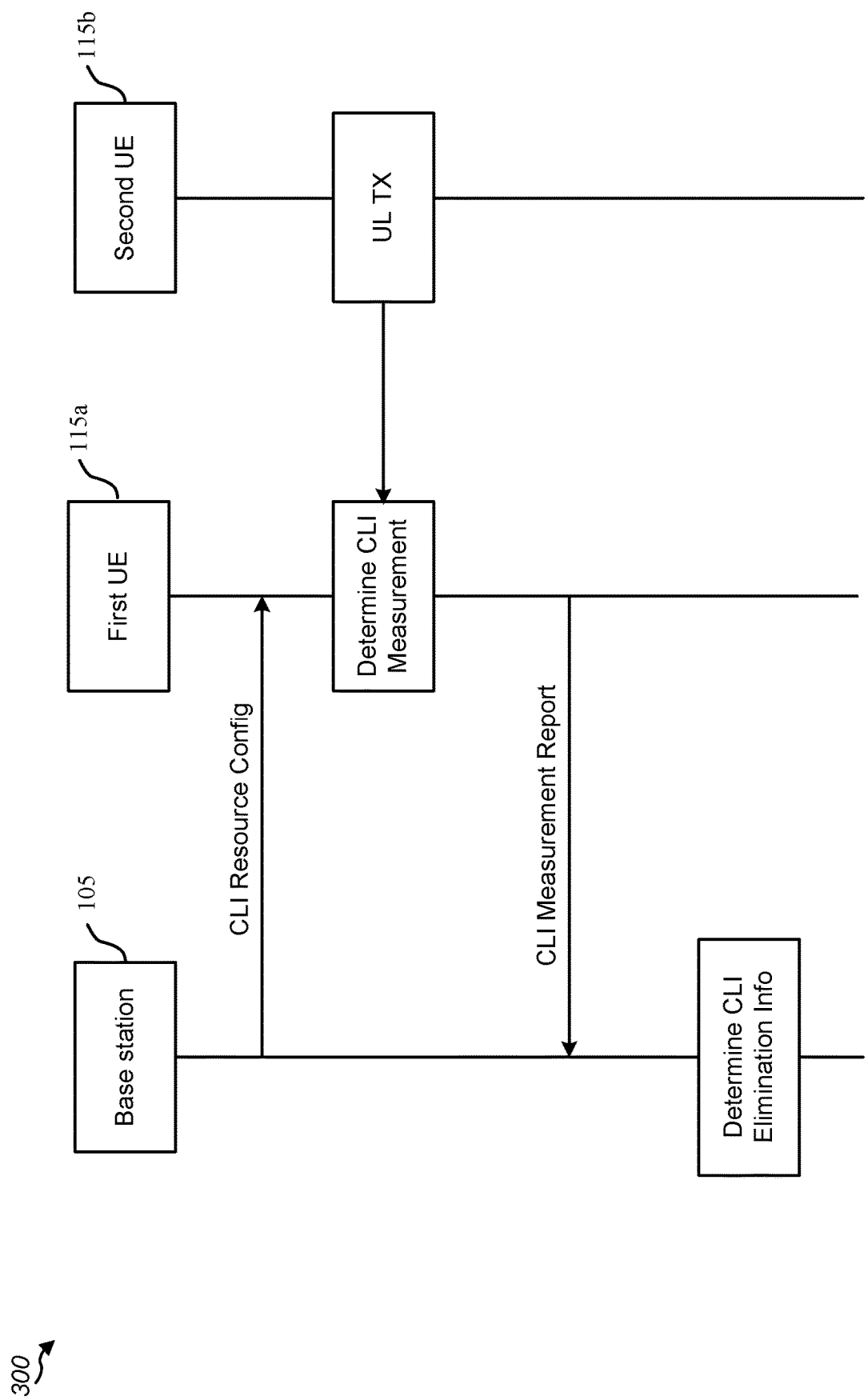
FIG. 3 is a ladder diagram illustrating an example wireless communication system that supports cross-link interference (CLI) measurement and elimination operations according to some aspects.

FIG. 3 is a ladder diagram 300 illustrating an example wireless communication system that supports CLI measurement and elimination operations according to some aspects. In FIG. 3, two UE's and a base station are illustrated. Specifically, a first UE 115a (victim UE) and a second UE 115b (aggressor UE) are illustrated along with a base station 105.

CLI is UE-to-UE interference. In CLI, an interference causing UE is referred to as an aggressor UE and a UE that receives the interference is referred to as a victim UE. CLI may occur in all types of wireless communication networks. As one example, CLI may occur when devices are operating in TDD modes.

In a TDD system, nearby UEs may have different UL-DL slot formats. For example, one UE, such as the second UE 115b, may have an uplink symbol which occurs at the same time as a downlink symbol for another UE, such as the first UE 115a. This difference causes a slot or symbol mismatch. During such a mismatch, one UE (victim UE) receives a transmission from another UE or UEs (aggressor UE or UEs) when an uplink symbol (that is an interfering symbol) of the aggressor UE or UEs collides with a downlink symbol of the victim UE. This collision of symbols is known as CLI.

For example, as illustrated in FIG. 3, the second UE 115b (aggressor UE) performs an uplink transmission which interferes which a downlink reception for the first UE 115a (victim UE) and optionally one or more other victim UEs. CLI may be caused by uplink transmissions from the aggressor UE including PUCCH, PUSCH, physical random access channel (PRACH) preamble, or sounding reference signal (SRS) transmissions.

A network may perform operations to reduce or eliminate CLI. An example of such procedure is illustrated in FIG. 3. For example, the base station 105 configures CLI resources for interference management (CLI management) by sending CLI resource information to the first UE 115a. The CLI resource information configures the first UE 115a (victim UE) to measure the CLI caused by the second UE 115b (aggressor UE) in the resource identified for CLI measurement.

The first UE 115a (victim UE) measures the CLI caused by the second UE 115b (aggressor UE) in the resource identified, and reports the measured CLI back to the network in another resource indicated by the network, as illustrated in FIG. 3.

The CLI measurement and reporting does not impact the uplink transmission of the second UE 115b (aggressor UE). The CLI measurement and reporting may utilize Layer 3 messaging. Additionally or alternatively, the measurement can be sounding reference signal (SRS) reference signal receive power (RSRP) (SRS-RSRP) or CLI received signal strength indicator (RSSI), and measurement resource configuration may be provided in measurement objects. The measurement resource configuration may include periodicity, frequency resource blocks, and OFDM symbols where CLI is to be measured.

The network may then determine CLI reduction or elimination information based on the received CLI measurement data. For example, the base station 105 may adjust a slot format of one or more UEs to reduce or eliminate slot mismatches, and thus CLI between the UEs. Additionally, or alternatively, the network may adjust other settings to reduce or eliminate CLI between one or more UEs. Accordingly, a network may coordinate CLI measurement and reduction operations.

In addition to CLI operations, a device can determine a position of another device based on an angle of arriving signals. For example, it has been proposed in 3GPP Release-16 that a base station may be able to determine a position of UE-based on uplink signals in 5G. For example, an AoA estimation is made by a base station using a directional antenna, such as a phased array antenna, to determine which direction a signal was transmitted from.

When combined with a range estimate (such as a round trip time (RTT) range estimation), a network can determine a location estimate for a UE even with a single base station. That is, a UE's position can be determined independent of triangulation from multiple base stations.

In some implementations, the base station may determine multiple arrival angles, such as an AoA and a zenith AoA (ZoA). The AoA, ZoA, or both may be defined in a Global Coordinate System (GCS) or a Local Coordinate System (LCS). A GCS may use a common reference direction such as geographical North, while a LCS may use a local reference direction and an offset angle from the local reference direction to a common reference direction.

However, conventional angle-based positioning in NR has angle estimation with limited granularity, especially for UEs which are far from the UE. For example, as the distance from the base station increases, a potential location size of the UE increases and thus, for UEs which are far from the base station, an area of potential locations may be relatively large.

Additionally, conventional angle-based positioning in 5G NR involves a relatively large resource cost for the network and UE. For example, a base station (such as gNB) has to schedule a dedicated resource for the AoA estimation for each UE. The scheduling and reporting of the dedicated resource involves additional resource cost and overhead.

In the aspects of the disclosure are described herein, a CLI procedure can be leveraged to make an AoA estimation among UEs. Such CLI-based AoA estimation can be performed with relatively limited or reduced resource cost, such as compared to using a dedicated resource for AoA estimation. Such AoA estimations may be used to determine UE-to-UE position. Such CLI-based AoA estimation can be used in addition to or in the alternative of network-based AoA estimations. When combined with network-based AoA estimation, the UE information may be used as complementary information to improve the current NR positioning accuracy. When used independent of network-based AoA estimation, the network may be able to determine a position of a first UE based on network AoA estimation or another positioning method, and then may use UE-based AoA estimation to determine positions of other UEs from the first UE. Such relative positions may then be converted into positions relative to the base station. As such AoA estimations between UEs will usually involve smaller distances than network-to-UE AoA estimations, the angle estimation accuracy may be increased over network AoA estimations. The increased AoA estimation accuracy leads to increased positioning accuracy, and thus reliability and coverage may be improved.

Figure 4:
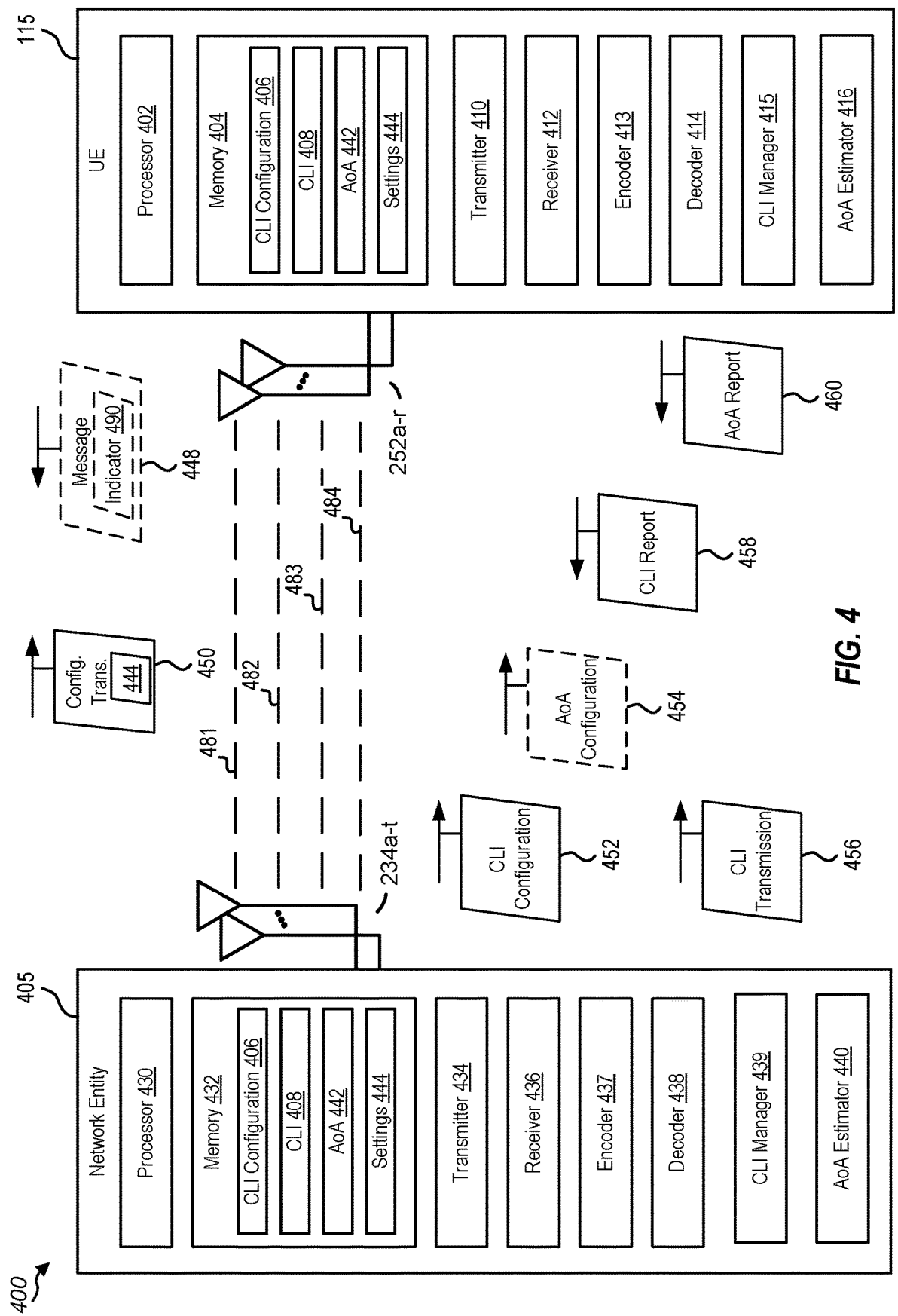
FIG. 4 illustrates an example of a wireless communications system that supports CLI angle-of-arrival (AoA) configuration and measurement operations according to some aspects.

FIG. 4 illustrates an example of a wireless communications system 400 that supports CLI AoA configuration and measurement operations according to some aspects. In some examples, wireless communications system 400 may implement aspects of wireless communication system 100. For example, wireless communications system 400 may include UE 115 and network entity 405. Although one UE 115 and one network entity 405 are illustrated, in some other implementations, the wireless communications system 400 may generally include multiple UEs 115, and may include more than one network entity 405. CLI AoA configuration and measurement operations may increase reliability and coverage by enabling a UE to determine AoA information and increase device positioning operations. Thus, network and device performance can be increased.

Network entity 405 and UE 115 UE 115 may be configured to communicate via frequency bands, such as FR1 having a frequency of 410 to 7125 MHz, FR2 having a frequency of 24250 to 52600 MHz for mm-Wave, one or more other frequency bands, or a combination thereof. It is noted that sub-carrier spacing may be equal to 15, 30, 60, or 120 kHz for some data channels. Network entity 405 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, sidelink channel transmissions, or a combination thereof.

Such transmissions may include a PDCCH, a PDSCH, a PUCCH, a PUSCH, a Physical Sidelink Control Channel (PSCCH), a Physical Sidelink Shared Channel (PSSCH), or a Physical Sidelink Feedback Channel (PSFCH). Such transmissions may be scheduled by aperiodic grants, periodic grants, or both.

Each periodic grant may have a corresponding configuration, such as configuration parameters/settings. The periodic grant configuration may include configured grant (CG) configurations and settings. Additionally, or alternatively, one or more periodic grants (such as CGs thereof) may have or be assigned to a CC ID, such as intended CC ID.

Each CC may have a corresponding configuration, such as configuration parameters/settings. The configuration may include bandwidth, bandwidth part, hybrid automatic repeat request (HARQ) process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam, same symbol, or both.

In some implementations, control information may be communicated via network entity 405 and UE 115. For example, the control information may be communicated suing medium access control-control element (MAC-CE) transmissions, radio resource control (RRC) transmissions, downlink control information (DCI), transmissions, another transmission, or a combination thereof.

UE 115 can include a variety of components (such as structural, hardware components) used for carrying out one or more functions described herein. For example, these components can include one or more processors 402 (hereinafter referred to collectively as "the processor 402"), one or more memory devices 404 (hereinafter referred to collectively as "the memory 404"), one or more transmitters 410 (hereinafter referred to collectively as "the transmitter 410"), and one or more receivers 412 (hereinafter referred to collectively as "the receiver 412"), encoder, 413, decoder 414, CLI manager 415, AoA estimator 416, and one or more antenna arrays 252a-r (hereinafter referred to collectively as "the antenna array 252").

The processor 402 may be configured to execute instructions stored in the memory 404 to perform the operations described herein. In some implementations, the processor 402 includes or corresponds to one or more of the receive processor 258, the transmit processor 264, and the controller 280, and the memory 404 includes or corresponds to the memory 282. The memory 404 may also be configured to store CLI configuration data 406, CLI data 408, AoA data 442, settings data 444, or a combination thereof, as further described herein.

The CLI configuration data 406 includes or corresponds to data associated with or corresponding to CLI resource configuration information. For example, the CLI configuration data 406 may indicate one or more resources, such as SRS-RSRP or CLI-RSSI, for CLI measurement reporting. The CLI configuration data 406 may also include configurations or settings for measurement and reporting CLI data.

The CLI data 408 includes or corresponds to data indicating or corresponding to CLI measurements for CLI transmissions. For example, the CLI data 408 may include CLI measurements for one or more CLI transmissions. The CLI transmission may be from one or multiple UEs.

The AoA data 442 includes or corresponds to data that is associated with CLI AoA estimation. The AoA data 442 may include AoA estimation configuration data. The AoA estimation configuration data may include resources for AoA estimation and reporting, and optionally settings for reporting. The AoA data 442 may also include an estimated AoA value or values. The AoA data 442 may further include AoA report data.

The settings data 444 includes or corresponds to data associated with CLI AoA configuration and measurement operations. The settings data 444 may include one or more types of CLI AoA configuration and measurement operations modes and thresholds or conditions for switching between CLI AoA configuration and measurement operations and configurations. For example, the settings data 444 may have data indicating different thresholds for different CLI AoA configuration and measurement operations modes, such as UE configured modes or network configured modes.

The transmitter 410 is configured to transmit reference signals, control information and data to one or more other devices, and the receiver 412 is configured to receive references signals, synchronization signals, control information and data from one or more other devices. For example, the transmitter 410 may transmit signaling, control information and data to, and the receiver 412 may receive signaling, control information and data from, the network entity 405. In some implementations, the transmitter 410 and the receiver 412 may be integrated in one or more transceivers. Additionally or alternatively, the transmitter 410 or the receiver 412 may include or correspond to one or more components of the UE 115 described with reference to FIG. 2.

The antenna array 252 may include multiple antenna elements configured to perform wireless communications with other devices, such as with the network entity 405. In some implementations, the antenna array 252 may be configured to perform wireless communications using different beams, also referred to as antenna beams. The beams may include TX beams and RX beams. To illustrate, the antenna array 252 may include multiple independent sets (or subsets) of antenna elements (or multiple individual antenna arrays), and each set of antenna elements of the antenna array 252 may be configured to communicate using a different respective beam that may have a different respective direction than the other beams. For example, a first set of antenna elements of the antenna array 252 may be configured to communicate via a first beam having a first direction, and a second set of antenna elements of the antenna array 252 may be configured to communicate via a second beam having a second direction. In other implementations, the antenna array 252 may be configured to communicate via more than two beams. Alternatively, one or more sets of antenna elements of the antenna array 252 may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array 252 may include or correspond to multiple antenna panels, and each antenna panel may be configured to communicate using a different respective beam.

Encoder 413 and decoder 414 may be configured to encode and decode data for transmission. CLI manager 415 may be configured to determine and perform CLI management operations, such as configuration, measurement and reporting operations. For example, CLI manager 415 is configured to determine and implement a network received CLI configuration. CLI manager 415 is configured measure and report CLI based on the network received CLI configuration.

AoA estimator 416 may be configured to determine and AoA management operations, such as configuration, measurement and reporting operations. For example, AoA estimator 416 is configured to determine and implement a network received AoA configuration. As another example, AoA estimator 416 is configured to determine and implement a UE determined AoA configuration. AoA estimator 416 is configured measure and report AoA based on the network received AoA configuration.

The network entity 405 can include a variety of components (such as structural, hardware components) used for carrying out one or more functions described herein. For example, these components can include one or more processors 430 (hereinafter referred to collectively as "the processor 430"), one or more memory devices 432 (hereinafter referred to collectively as "the memory 432"), one or more transmitters 434 (hereinafter referred to collectively as "the transmitter 434"), and one or more receivers 436 (hereinafter referred to collectively as "the receiver 436"), and one or more antenna arrays 234a-t (hereinafter referred to collectively as "the antenna array 234"). The processor 430 may be configured to execute instructions stored in the memory 432 to perform the operations described herein. In some implementations, the processor 430 includes or corresponds to one or more of the receive processor 238, the transmit processor 220, and the controller 240, and the memory 432 includes or corresponds to the memory 242. The memory 432 may be configured to CLI configuration data 406, CLI data 408, AoA data 442, settings data 444, or a combination thereof, similar to the UE 115 and as further described herein.

The transmitter 434 is configured to transmit reference signals, synchronization signals, control information and data to one or more other devices, and the receiver 434 is configured to receive reference signals, control information and data from one or more other devices. For example, the transmitter 434 may transmit signaling, control information and data to, and the receiver 436 may receive signaling, control information and data from, the UE 115. In some implementations, the transmitter 434 and the receiver 436 may be integrated in one or more transceivers. Additionally or alternatively, the transmitter 434 or the receiver 436 may include or correspond to one or more components of base station 105 described with reference to FIG. 2.

The antenna array 234 may include multiple antenna elements configured to perform wireless communications with other devices, such as with the UE 115. In some implementations, the antenna array 234 may be configured to perform wireless communications using different beams, also referred to as antenna beams. The beams may include TX beams and RX beams. To illustrate, the antenna array 234 may include multiple independent sets (or subsets) of antenna elements (or multiple individual antenna arrays), and each set of antenna elements of the antenna array 234 may be configured to communicate using a different respective beam that may have a different respective direction than the other beams. For example, a first set of antenna elements of the antenna array 234 may be configured to communicate via a first beam having a first direction, and a second set of antenna elements of the antenna array 234 may be configured to communicate via a second beam having a second direction. In other implementations, the antenna array 234 may be configured to communicate via more than two beams. Alternatively, one or more sets of antenna elements of the antenna array 234 may be configured to concurrently generate multiple beams, for example using multiple RF chains of the network entity 405. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array 234 may include or correspond to multiple antenna panels, and each antenna panel may be configured to communicate using a different respective beam.

Encoder 437, and decoder 438 may include the same functionality as described with reference to encoder 413 and decoder 414, respectively. CLI manager 439 may include similar functionality as described with reference to CLI manager 415. AoA estimator 440 may include similar functionality as described with reference to AoA estimator 416.

In some implementations, the wireless communications system 400 implements a 5G New Radio (NR) network. For example, the wireless communications system 400 may include multiple 5G-capable UEs 115 and multiple 5G-capable network entities 405, such as UEs and base stations configured to operate in accordance with a 5G NR network protocol such as that defined by the 3GPP.

During operation of wireless communications system 400, network entity 405 may determine that UE 115 has CLI AoA configuration and measurement capability. For example, UE 115 may transmit a message 448 that includes a CLI AoA configuration and measurement indicator 490. Indicator 490 may indicate CLI AoA configuration and measurement operation capability or a particular type or mode of CLI AoA configuration and measurement operation. In some implementations, network entity 405 sends control information to indicate to UE 115 that CLI AoA configuration and measurement operation and a particular type of CLI AoA configuration and measurement operation is to be used. For example, in some implementations, message 448 (or another message, such as configuration transmission 450) is transmitted by the network entity 405. The configuration transmission 450 may include or indicate to use CLI AoA configuration and measurement operations or to adjust or implement a setting of a particular type of CLI AoA configuration and measurement operation.

During operation, devices of wireless communications system 400, perform CLI AoA configuration and measurement operations. For example, the network entity 405 and the UE 115 exchange transmissions to determine AoA and UE position. In the example of FIG. 4, the network entity 405 transmits a CLI configuration 452 to the UE 115. The CLI configuration 452 may include or indicate a particular CLI configuration or multiple CLI configurations (such as CLI configuration data 406). To illustrate, the network entity 405 may send an RRC message indicating a CLI configuration. As another illustration, the network entity 405 may send an RRC message which includes multiple CLI resources, such as a pattern or set of CLI resources.

In some implementations, the network entity 405 optionally transmits an AoA configuration 454 to the UE 115. The AoA configuration 454 may include or indicate a particular AoA configuration or multiple AoA configurations (such as AoA data 442). To illustrate, the AoA configuration 454 may indicate multiple resources for AoA estimation.

In other implementations, the UE 115 determines an AoA configuration. For example, the UE 115 may determine an AoA configuration based on the CLI configuration, an uplink transmission, a sidelink transmission, device settings, or a combination thereof.

The UE 115 receives CLI caused by a transmission from another device (not shown), referred to as a CLI transmission 456. CLI interference may be caused by the UE 115 receiving another transmission, such as a downlink transmission from the network entity 405 intended for the UE 115, while detecting energy from the CLI transmission 456 which may not be intended for the UE 115. For example, the CLI transmission 456 may be sent by another UE with a different slot format, referred to as an aggressor UE.

The UE 115 performs a CLI measurement operation, such as measures the CLI caused by the CLI transmission 456, to determine a CLI value. The UE 115 generates and transmits a CLI report 458 to the network entity 405 based on the measurement operation and the CLI value. The CLI report 458 may be further generated and transmitted based on the received CLI configuration.

The UE 115 performs an AoA measurement operation, such as estimates the AoA of the CLI, caused by the CLI transmission 456, to determine an AoA value. The AoA value may include or correspond to an estimated AoA value, estimated angle value. The UE 115 generates and transmits an AoA report 460 based on the measurement operation and the AoA value. The AoA report 460 may be further generated and transmitted on the received CLI configuration, the AoA configuration, or both In some implementations, the UE 115 transmits the AoA report 460 to the network entity 405. Additionally, or alternatively, the UE 115 transmits the AoA report 460 to another device, such as the aggressor UE, another UE, or another base station.

In some implementations, the CLI report 458 and the AoA report 460 are transmitted in the same transmission. In other implementations, the CLI report 458 and the AoA report 460 are transmitted in different transmissions. Details of the reports and transmissions are described further with reference to FIGS. 5 and 6.

The network entity 405 generates CLI elimination information and optionally UE positioning information. For example, the network entity 405 generates CLI estimation information based on the CLI report 458 and generates UE positioning information based on the AoA report 460. The UE positioning information may include positioning information of the UE 115 (victim UE), the aggressor UE, or both.

The network entity 405, the UE 115, or both, may optionally perform one or more transmissions using the CLI elimination information, UE positioning information, or both. For example, the network entity 405 may transmit CLI elimination information to the UE 115 to adjust one or more settings, such as slot format, to reduce or eliminate CLI. As another example, the network entity 405 may adjust a beam, a transmission setting, or a reception setting based on the positioning information of the UE 115 (victim UE), the aggressor UE, or both.

Accordingly, the UE 115 and network entity 405 may be able to more efficiently and effectively perform AoA estimation operations. Thus, FIG. 4 describes enhanced AoA estimation operations. Using enhanced, such as CLI-based, AoA estimation operations may enable positioning determination improvements as compared to network only based AoA estimations. Performing enhanced AoA estimation enables increased reliability and coverage and thus, enhanced UE and network performance by increasing throughput and reducing latency.

Figure 5:
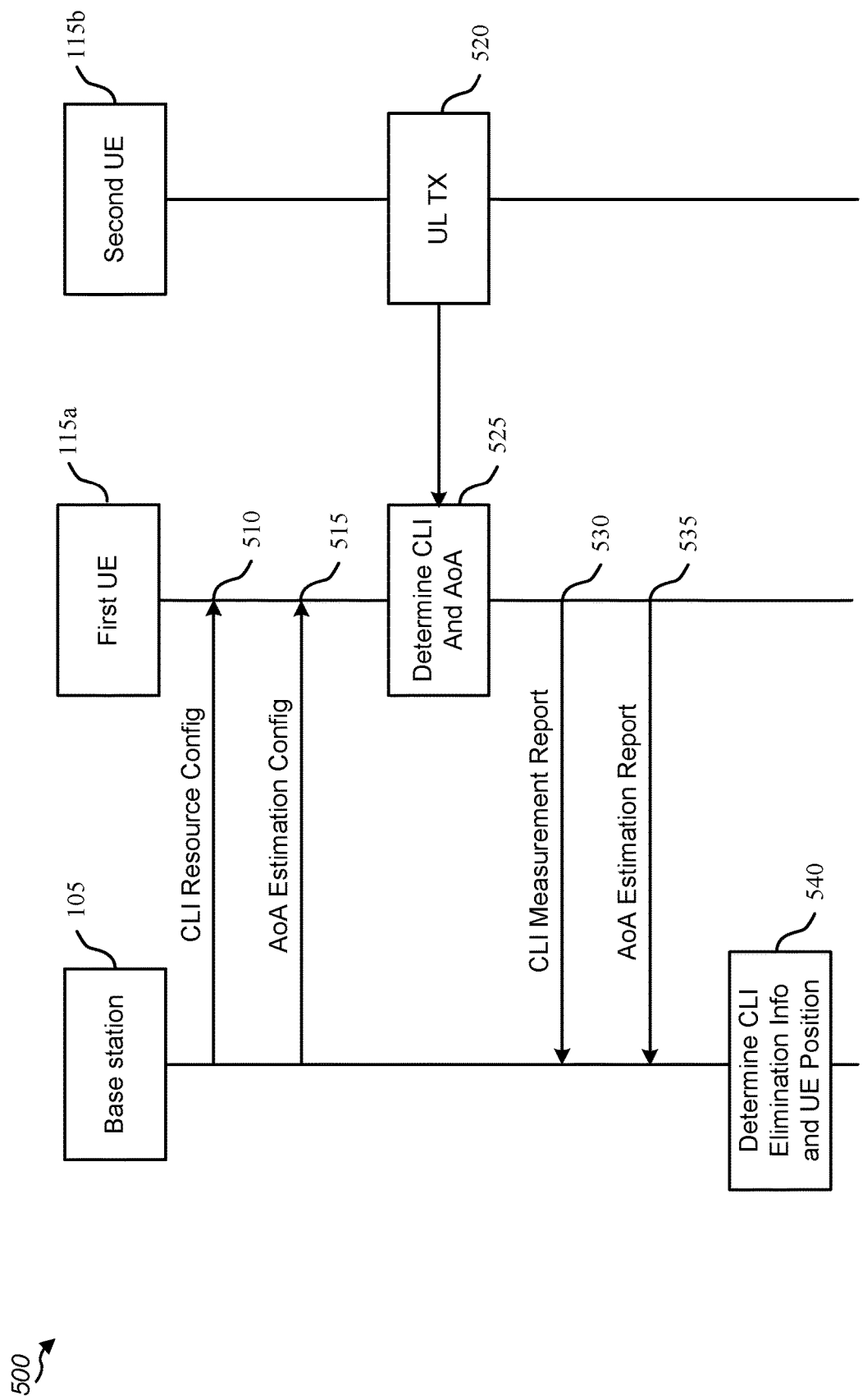
FIG. 5 is a ladder diagram of network-configured UE-based CLI AoA estimation operations according to some aspects.
Figure 6:
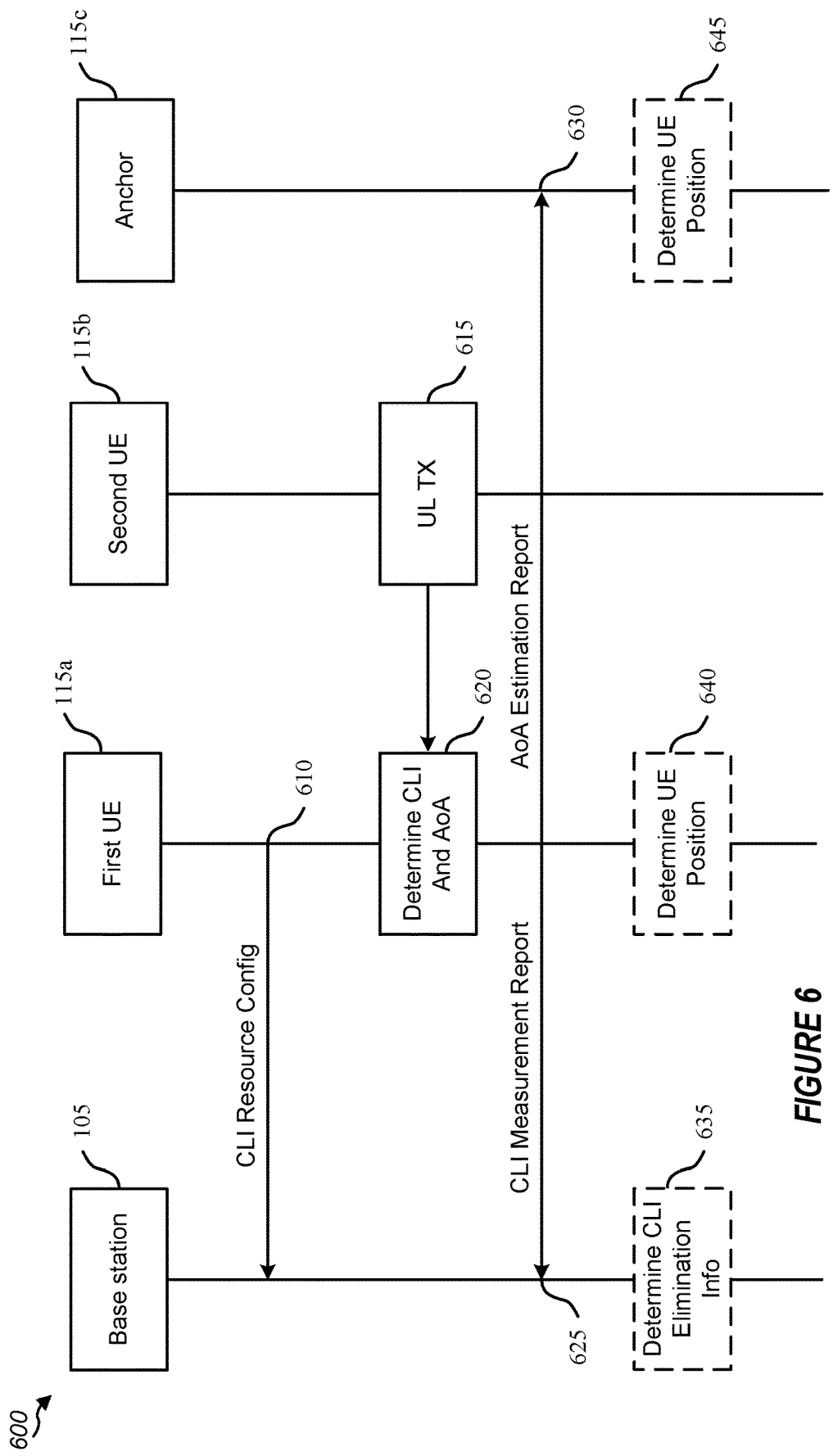
FIG. 6 is a ladder diagram of UE-configured CLI AoA estimation operations according to some aspects.

FIGS. 5 and 6 illustrate examples of ladder diagrams for CLI AoA configuration and estimation operations according to some aspects. Referring to FIG. 5, FIG. 5 is a ladder diagram 500 of network configured UE-based CLI AoA estimation operations according to some aspects. In the example of FIG. 5, the ladder diagram illustrates multiple UEs, such as a first UE 115a and a second UE 115b, and a network entity, such as base station 105.

At 510, the base station 105 (such as a gNB) transmits CLI resource configuration information to the first UE 115a. For example, the base station 105 generates and transmits a CLI resource configuration message to the first UE 115a. The CLI resource configuration message may include or correspond to a higher layer message, such as a layer 3 message. For example, the base station 105 generates a RRC message which indicates or includes the CLI resource configuration information. In some implementations, the CLI resource configuration message is sent to multiple UEs. In other implementations, the CLI resource configuration message is a PDCCH transmission, such as a DCI, or a MAC CE.

At 515, the base station 105 transmits AoA estimation configuration information to the first UE 115a. For example, the base station 105 generates and transmits an AoA estimation configuration message to the first UE 115a. The AoA estimation configuration message may include or correspond to a higher layer message, such as a layer 3 message. For example, the base station 105 generates a RRC message which indicates or includes the CLI resource configuration information. In some implementations, the AoA estimation configuration message is sent to multiple UEs. In other implementations, the AoA estimation configuration message is a PDCCH transmission, such as a DCI, or a MAC CE.

In some implementations, the AoA estimation configuration information is included in multiple messages. For example, the base station 105 may send one message to indicate which SRS-RSRP resource should be estimated to get the AoA, one message to configure how to report the AoA estimation, and one message to indicate the type of the estimated AoA. The type of AoA may indicate whether the AoA is indicated as an absolute angle, or as a relative angle compared to particular reference direction, that is in a GCS or a LCS format.

Although the CLI resource configuration information and the AoA estimation configuration information are illustrated on separate lines, the CLI resource configuration information and the AoA estimation configuration information may be transmitted in the same message or transmission. For example, the CLI resource configuration information may be transmitted in a CLI resource configuration message; the AoA estimation configuration information may be included in the CLI resource configuration message. To illustrate, an additional element, such as CLI AoA estimation configuration, can be added to the CLI resource configuration message or an additional field or fields can be added or appended to the CLI resource configuration message. Alternatively, a portion of the AoA estimation configuration information may be included with the CLI resource configuration information. For example, the SRS-RSRP resource for AoA estimation may be embedded in the CLI configuration and the AoA report configuration information and the AoA type configuration information may be in a different message or messages.

At 520, the second UE 115b generates and transmits an uplink transmission. For example, the second UE 115b generates and transmits a PUSCH transmission. The PUSCH transmission may be sent to or intended for the base station 105 or another device, such as another base station. In other implementations, the second UE 115b generates and transmits a sidelink transmission. For example, the second UE 115b transmits a PSCCH transmission or a PSSCH transmission. The sidelink transmission may be sent to or intended for another UE.

In some implementations, the first UE 115a may also be receiving a transmission at 515. For example, the first UE 115a may receive a downlink transmission or a sidelink transmission at least partially concurrently with the transmission from the second UE 115b. The two transmission may interfere with each other and thus, the first UE 115a may experience CLI from or caused by the transmission from the second UE 115b.

At 525, the first UE 115a performs a CLI measurement operation based on the CLI resource configuration information. For example, the first UE 115a determines CLI for or caused by the uplink transmission from the second UE 115b based on CLI configurations indicated in the CLI resource configuration message. The first UE 115a also performs an AoA estimation operation for the CLI from the transmission sent by the second UE 115b. For example, the first UE 115a may perform an AoA estimation based on the AoA configuration information. The first UE 115a may perform an AoA estimation similar to how a base station would perform a conventional AoA estimation for uplink transmissions in some implementations.

In other implementations, the first UE 115a may perform different AoA estimation operations depending on a spectrum associated with the uplink transmission. For example, when operating in Sub-6 GHz, a UE may use digital beamforming in postprocessing after it receives SRS samples, and thus a one-time SRS transmission can be enough for AoA estimation. Also, when multiple SRS-RSRP resources are configured, a UE can estimate the AoA many times. The UE may then be able to determine the AoA based on the multiple estimations, such as by averaging, averaging after filtering out extreme values, or another scheme.

As another example, when operating in mm Wave spectrum, analog beamforming may be used and thus SRS transmissions may be repeated for a single AoA estimation. In such implementations, multiple SRS resources may be configured, such as a SRS resource pattern. In some such implementations where multiple SRS resources are configured, the UE may use different beams to estimate the AoA in different configured SRS-RSRP resources. For example, each time there is opportunity for CLI measurement, a UE may conduct a one receive beam sweep at specific angle, such as a first angle (a1). In a next opportunity for CLI measurement (SRS reception), the UE conducts a second one-time receive beam sweep at second angle (a2), and so on.

At 530, the first UE 115a generates and transmits a CLI measurement report to the base station 105 based on the CLI measurement. For example, the first UE 115a generates and transmits a CLI report message including a determined CLI value. The CLI measurement report may be generated and transmitted based on the CLI resource configuration information. For example, the timing and structure of the CLI measurement report may be determined based on the CLI resource configuration information. The CLI measurement report may include or correspond to a higher layer message, such as a layer 3 message. For example, the base station 105 generates a RRC message which includes the CLI measurement report. In other implementations, the CLI measurement report is a PUCCH transmission, such as an uplink control information (UCI), a PUSCH transmission, or a MAC CE.

At 535, the first UE 115a generates and transmits an AoA estimation report to the base station 105. For example, the first UE 115a generates and transmits an AoA report message including an estimated AoA value. The AoA report may be generated and transmitted based on the AoA estimation configuration information. For example, the timing and structure of the AoA report may be determined based on the AoA estimation configuration information. The AoA report message may include or correspond to a higher layer message, such as a layer 3 message. For example, the first UE 115a generates a RRC message which includes the AoA report information. In other implementations, the AoA report message is an uplink channel transmission. For example, the AoA report message is PUCCH transmission, such as a UCI, a PUSCH transmission, or a MAC CE.

In some implementations, the first UE 115 may additionally send the AoA estimation report to one or more other devices, such as the second UE, one or more other UEs, an anchor device, or another base station. The UEs which receive the AoA estimation report may be premium or advanced UEs. Transmission of the AoA estimation report to other devices is described further with reference to FIG. 6.

At 540, the base station 105 may optionally determine CLI elimination information based on the CLI measurement report and UE positioning information based on the AoA measurement report. For example, the base station 105 may determine one or more adjustments to reduce or eliminate CLI between UEs, such as between the first and second UEs 115a and 115b; the base station 105 may determine a position of first UE 115a, the second UE 115b, or both, based on the AoA value of the AoA measurement report.

At 545, the first UE 115a may optionally determine UE positioning. For example, the first UE 115a may determine position information for the second UE 115b based on the AoA estimation information.

Although the CLI measurement report and the AoA estimation report are illustrated on separate lines, the CLI measurement report and the AoA estimation report may be transmitted in the same message or transmission. For example, the CLI measurement report may be transmitted in a CLI report message; the AoA estimation report may be included in the CLI report message. To illustrate, an additional element, such as CLI AoA estimation, can be added to the CLI report message or an additional field or fields can be added or appended to the CLI report message. As another illustration, an AoA estimated angle can be embedded into the CLI measurement report.

In some implementations where the AoA estimation report is embedded into the CLI measurement report, the AoA estimation report should follow the CLI measurement pattern. For example, each CLI report would include the CLI measurement for the configured resource, and the corresponding estimated angle information of the AoA report.

Alternatively, the AoA estimation report is in separate signaling. For example, the AoA measurement report could may be transmitted in a PUSCH transmission which is scheduled by RRC signaling.

In some implementations where the AoA estimation report is separate from the CLI measurement report, the AoA estimation report may be based on each configured SRS-RSRP resource. For example, each configured SRS-RSRP resource is associated with one AoA measurement.

In other implementations where the AoA estimation report is separate from the CLI measurement report, the AoA estimation report may be based on a configured SRS-RSRP pattern of resources, such as a set of configured SRS-RSRP resources. For example, for each pattern (set), only one estimation would be reported, Such reduced reporting may reduce feedback resource use.

Thus, in the example in FIG. 5, the devices perform UE-based AoA measurement and reporting operations based on network configurations. That is, the UE receives configuration information from a network and measures and reports AoA information based on the received configuration.

Referring to FIG. 6, FIG. 6 is a ladder diagram 600 of UE configured CLI AoA estimation operations according to some aspects. In the example of FIG. 6, the ladder diagram illustrates UEs, an anchor device, and a network entity, such as base station 105. As compared to the network configuration in the ladder diagram of FIG. 5, the ladder diagram of FIG. 6 illustrates UE configuration for CLI AoA estimation operations.

At 610, the base station 105 (such as a gNB) transmits CLI resource configuration information to the first UE 115a. For example, the base station 105 generates and transmits a CLI resource configuration message to the first UE 115a. The CLI resource configuration message may include or correspond to a higher layer message, such as a layer 3 message. For example, the base station 105 generates a RRC message which includes the CLI resource configuration information. In some implementations, the CLI resource configuration message is sent to multiple UEs. In other implementations, the CLI resource configuration message is a PDCCH transmission, such as a DCI, or a MAC CE.

At 615, the second UE 115b generates and transmits an uplink transmission. For example, the second UE 115b generates and transmits a PUSCH transmission. The PUSCH transmission may be sent to or intended for the base station 105 or another device, such as another base station. In other implementations, the second UE 115b generates and transmits a sidelink transmission. For example, the second UE 115b transmits a PSCCH transmission or a PSSCH transmission. The sidelink transmission may be sent to or intended for another UE.

In some implementations, the first UE 115a may also be receiving a transmission at 615. For example, the first UE 115a may receive a downlink transmission or a sidelink transmission at least partially concurrently with the transmission from the second UE 115b. The two transmission may interfere with each other and thus, the first UE 115a may experience CLI from or caused by the transmission from the second UE 115b.

At 620, the first UE 115a perform a CLI measurement operation. For example, the first UE 115a determines CLI for or caused by the uplink transmission from the second UE 115b. The first UE 115a also performs an AoA estimation operation based on the CLI from the uplink transmission sent by the second UE 115b. For example, the first UE 115a may perform an AoA estimation independent of network configuration, signaling, or both. To illustrate, the first UE 115a may perform the AoA estimation independent of AoA configuration information. The first UE 115a may perform the AoA estimation based on determining a SRS-RSRP resource is configured in the CLI resource configuration information.

At 625, the first UE 115a generates and transmits a CLI measurement report to the base station 105. For example, the first UE 115a generates and transmits a CLI report message including a determined CLI value. The CLI measurement report may include or correspond to a higher layer message, such as a layer 3 message. For example, the base station 105 generates a RRC message which includes the CLI measurement report. In other implementations, the CLI measurement report is a PUCCH transmission, such as a UCI, a PUSCH transmission, or a MAC CE.

At 630, the first UE 115a generates and transmits an AoA estimation report to an anchor device. For example, the first UE 115a generates and transmits an AoA report message including an estimated AoA value. The AoA report message is sent to an anchor device in the example of FIG. 6. The anchor device may be a base station or another UE. The AoA report message may include or correspond to a higher layer message, such as a layer 3 message. For example, the first UE 115a generates a RRC message which includes the AoA report information. In other implementations, the AoA report message is an uplink channel transmission. For example, the AoA report message is PUCCH transmission, such as a UCI, a PUSCH transmission, or a MAC CE. In other implementations, the AoA report message is a sidelink channel transmission. For example, the AoA report message is a PSCCH transmission, such as a sidelink control information (SCI), a PSSCH transmission, or a MAC CE.

At 635, the base station 105 may optionally determine CLI elimination information based on the CLI measurement report. For example, the base station 105 may determine one or more adjustments to reduce or eliminate CLI between UEs, such as between the first and second UEs 115a and 115b, as described above with reference to FIGS. 4 and 5.

At 640, the first UE 115a may optionally determine UE positioning. For example, the first UE 115a may determine position information for the second UE 115b based on the AoA estimation information.

At 645, the anchor device 115c may optionally determine UE positioning. For example, the anchor device 115c may determine position information for the first UE 115a, the second UE 115b, or both, based on the AoA estimation report.

Thus, in the example in FIG. 6, the devices perform UE-based AoA measurement and reporting operations based on UE configurations. That is, the UE determines AoA configuration information and measures and reports AoA information based on the determined configuration. Additionally, or alternatively, one or more operations of FIGS. 4-6 may be added, removed, substituted in other implementations.

Figures 7, 8:
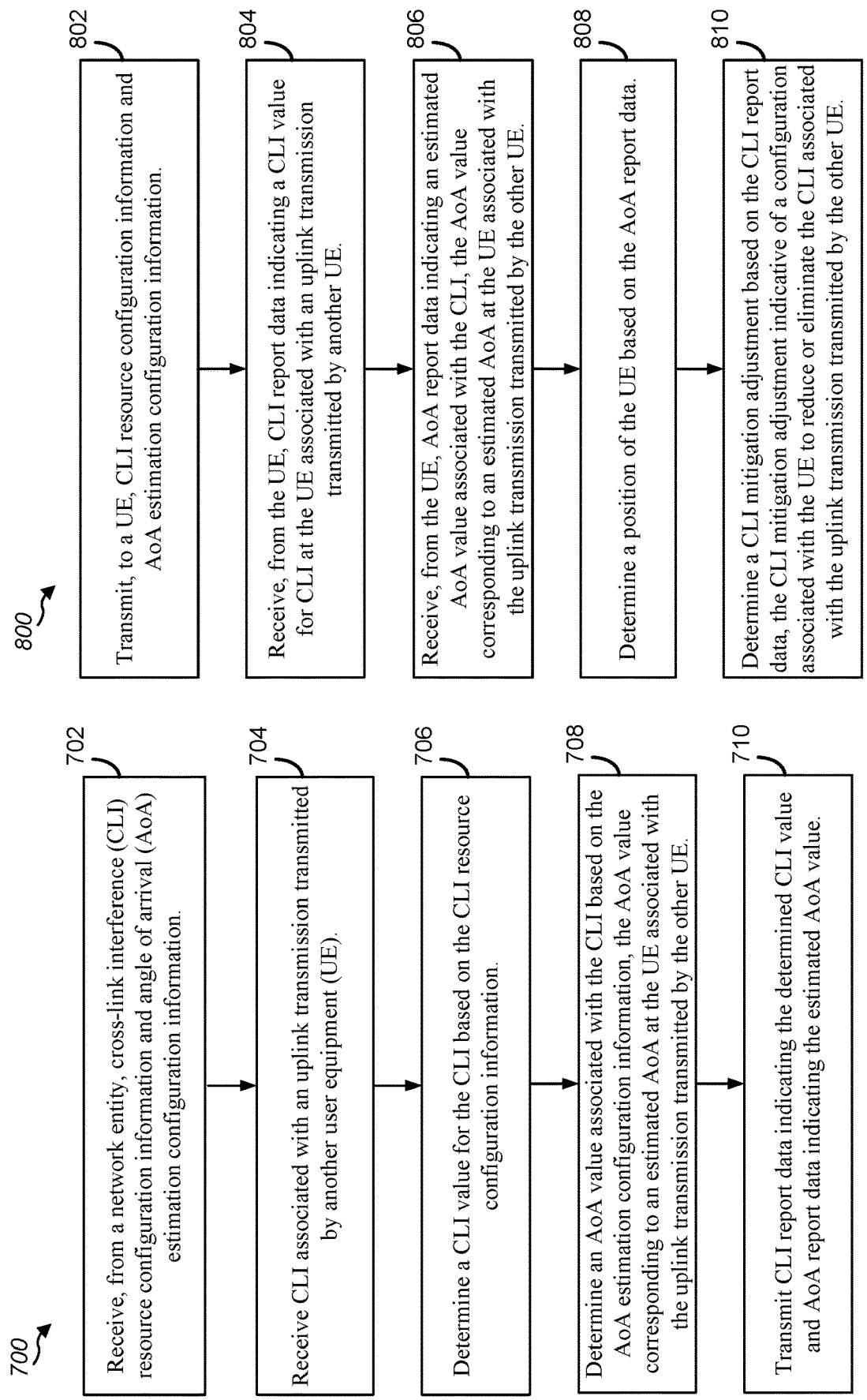
FIG. 7 is a flow diagram illustrating an example process that supports CLI AoA estimation operations according to some aspects.
FIG. 8 is a flow diagram illustrating an example process that supports CLI AoA estimation operations according to some aspects.

FIG. 7 is a flow diagram illustrating an example process 700 that supports CLI AoA estimation operations according to some aspects. Operations of the process 700 may be performed by a UE, such as the UE 115 described above with reference to FIGS. 1-10 or a UE as described with reference to FIG. 9. For example, example operations (also referred to as "blocks") of the process 700 may enable the UE 115 to perform CLI AoA estimation operations and report an estimated AoA value to another device.

In block 702, the UE 115 receives from a network entity, CLI resource configuration information and AoA estimation configuration information. For example, the UE 115 may receive a CLI resource configuration message including or indicating CLI resource configuration information.

In block 704, the UE 115 receives CLI associated with an uplink transmission transmitted by another user equipment. For example, the UE 115 may receive CLI from an uplink transmission sent by another UE, as described with reference to FIGS. 4-6.

In block 706, the UE 115 determines a CLI value for the CLI based on the CLI resource configuration information. For example, the UE 115 may perform CLI measurement operations on the CLI based on the received CLI resource configuration, as described with reference to FIGS. 4-6.

In block 708, the UE 115 determines an AoA value associated with the CLI based on the AoA estimation configuration information. The AoA value corresponds to an estimated AoA at the UE associated with the uplink transmission transmitted by the other UE. For example, the UE 115 may perform AoA estimation operations on the CLI based on the received AoA estimation configuration information, as described with reference to FIGS. 4-6.

In block 710, the UE 115 transmits CLI report data indicating the determined CLI value and AoA report data indicating the estimated AoA value. For example, the UE 115 may transmit a CLI report message and an AoA report message, as described with reference to FIGS. 4-6.

FIG. 8 is a flow diagram illustrating an example process 800 that supports CLI AoA estimation operations according to some aspects. Operations of the process 800 may be performed by a base station, such as the base station 105 described above with reference to FIGS. 1-6 or a base station as described with reference to FIG. 10. For example, example operations of the process 800 may enable the base station 105 to perform CLI AoA estimation operations.

In block 802, the base station 105 transmits, to a user equipment (UE), CLI resource configuration information and AoA estimation configuration information. For example, the base station 105 may transmit a CLI resource configuration message including the CLI resource configuration information and the AoA estimation configuration information, as described with reference to FIGS. 4-6.

In block 804, the base station 105 receives, from the UE, CLI report data indicating a CLI value for CLI at the UE associated with an uplink transmission transmitted by another UE. For example, the base station 105 may receive a CLI report message from the UE, as described with reference to FIGS. 4-6.

In block 806, the base station 105 receives, from the UE, AoA report data indicating an estimated AoA value associated with the CLI, the AoA value corresponding to an estimated AoA at the UE associated with the uplink transmission transmitted by the other U. For example, the base station 105 may receive an AoA report message from the UE, as described with reference to FIGS. 4-6.

In block 808, the base station 105 determines a position of the UE based on the AoA report data. For example, the base station 105 may determine a position of the UE based on the AoA report message and optionally range information, as described with reference to FIGS. 4-6.

In block 810, the base station 105 determines a CLI mitigation adjustment based on the CLI report data. The CLI mitigation adjustment indicative of a configuration associated with the UE to reduce or eliminate the CLI associated with the uplink transmission transmitted by the other UE. For example, the base station 105 may determine a slot format adjustment or beam adjustment for the UE based on the CLI report message, as described with reference to FIGS. 4-6.

Figure 9:
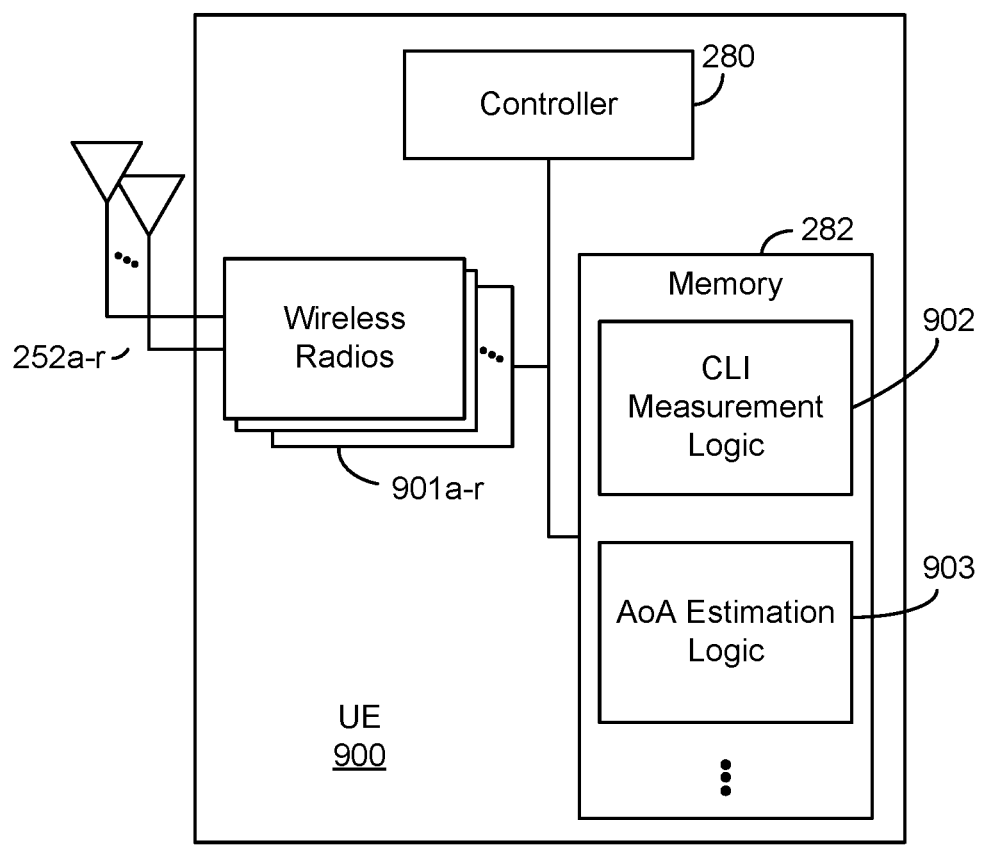
FIG. 9 is a block diagram of an example UE that supports CLI AoA estimation operations according to some aspects.

FIG. 9 is a block diagram of an example UE 900 that supports CLI AoA estimation operations according to some aspects. The UE 900 may be configured to perform operations, including the blocks of the process 700 described with reference to FIG. 4. In some implementations, the UE 900 includes the structure, hardware, and components shown and described with reference to the UE 115 of FIG. 2 or 4. For example, the UE 900 includes the controller 280, which operates to execute logic or computer instructions stored in the memory 282, as well as controlling the components of the UE 900 that provide the features and functionality of the UE 900. The UE 900, under control of the controller 280, transmits and receives signals via wireless radios 901*a-r* and the antennas 252*a-r*. The wireless radios 901*a-r* include various components and hardware, as illustrated in FIG. 2 for the UE 115, including the modulator and demodulators 254*a-r*, the MIMO detector 256, the receive processor 258, the transmit processor 264, and the TX MIMO processor 266.

As shown, the memory 282 may include CLI measurement logic 902 and AoA estimation logic 903. The CLI measurement logic 902 may be configured to perform CLI measurement operations. The AoA estimation logic 903 may be configured to perform AoA estimation measurement operations. The UE 900 may receive signals from or transmit signals to one or more network entities, such as the base station 105 of FIGS. 1-6 or a base station as illustrated in FIG. 10.

In some implementations, the UE 900 may be configured to perform the process 700 of FIG. 7. To illustrate, the UE 900 may execute, under control of the controller 280, the CLI measurement logic 902 and the AoA estimation logic 903 stored in the memory 282. The execution environment of the CLI measurement logic 902 provides the functionality to perform at least the operations in blocks 702, 704, 706, and 710. The execution environment of the AoA estimation logic 903 provides the functionality to perform at least the operations in blocks 702, 708, and 710.

Figure 10:
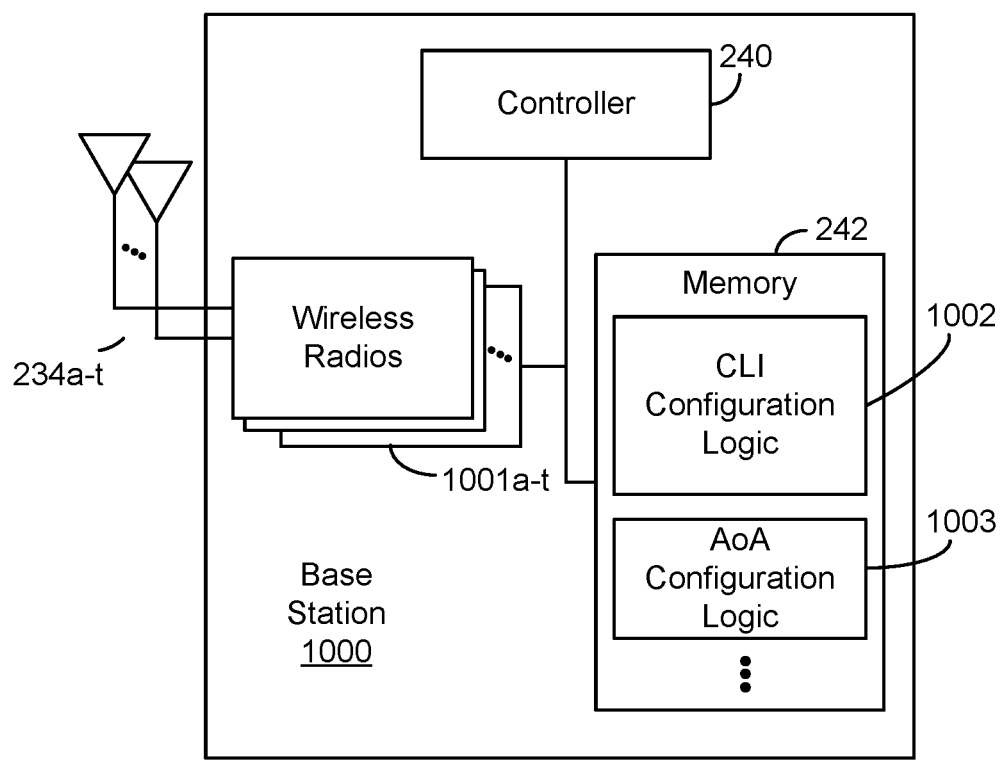
FIG. 10 is a block diagram of an example base station that supports CLI AoA estimation operations according to some aspects.

FIG. 10 is a block diagram of an example base station 1000 that supports CLI AoA estimation operations according to some aspects. The base station 1000 may be configured to perform operations, including the blocks of the process 800 described with reference to FIG. 8. In some implementations, the base station 1000 includes the structure, hardware, and components shown and described with reference to the base station 105 of FIGS. 1-6. For example, the base station 1000 may include the controller 240, which operates to execute logic or computer instructions stored in the memory 242, as well as controlling the components of the base station 1000 that provide the features and functionality of the base station 1000. The base station 1000, under control of the controller 240, transmits and receives signals via wireless radios 1001*a-t* and the antennas 234*a-t*. The wireless radios 1001*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

As shown, the memory 242 may include CLI configuration logic 1002 and AoA configuration logic 1003. The CLI configuration logic 1002 may be configured to determine CLI configuration information and signal the CLI configuration information. The AoA configuration logic 1003 may be configured to determine AoA configuration information and signal the AoA configuration information. The base station 1000 may receive signals from or transmit signals to one or more UEs, such as the UE 115 of FIGS. 1-6 or the UE 900 of FIG. 9.

In some implementations, the base station 1000 may be configured to perform the process 800 of FIG. 8. To illustrate, the base station 1000 may execute, under control of the controller 240, the CLI configuration logic 1002 and the AoA configuration logic 1003 stored in the memory 242. The execution environment of the CLI configuration logic 1002 provides the functionality to perform at least the operations in blocks 802, 804, and 808. The execution environment of the AoA configuration logic 1003 provides the functionality to perform at least the operations in blocks 802 and 806.

It is noted that one or more blocks (or operations) described with reference to FIGS. 7 and 8 may be combined with one or more blocks (or operations) described with reference to another of the figures. For example, one or more blocks (or operations) of FIG. 7 may be combined with one or more blocks (or operations) of FIG. 8. As another example, one or more blocks associated with FIG. 7 or 8 may be combined with one or more blocks (or operations) associated with FIG. 2, 4, or 6.

In some aspects, techniques for enabling CLI AoA estimation operations may include additional aspects, such as any single aspect or any combination of aspects described below or in connection with one or more other processes or devices described elsewhere herein. In some aspects, enabling CLI AoA estimation operations may include an apparatus is configured to: receive, from a network entity, CLI resource configuration information and AoA estimation configuration information; receive CLI associated with an uplink transmission transmitted by another device; determine a CLI value for the CLI based on the CLI resource configuration information; determine an AoA value associated with the CLI based on the AoA estimation configuration information, the AoA value corresponding to an estimated AoA at the apparatus associated with the uplink transmission transmitted by the other device; and transmit CLI report data indicating the determined CLI value and AoA report data indicating the estimated AoA value. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the UE is operating in a millimeter wave spectrum, and the UE has multiple antenna panels.

In a second aspect, alone or in combination with the first aspect, the UE is operating in sub-6 gigahertz spectrum, and the UE has multiple receive antennas.

In a third aspect, alone or in combination with one or more of the first through second aspects, estimated AoA value indicates an angle offset from a reference direction defined by a GCS.

In a fourth aspect, alone or in combination with one or more of the first through third aspects, the estimated AoA value indicates an angle offset from a reference direction defined by a LCS, and the AoA report data further includes a set of conversion angles to convert from the LCS to another coordinate system.

In a fifth aspect, alone or in combination with one or more of the first through fourth aspects, the CLI configuration information indicates a CLI SRS-RSRP resource configuration, the SRS-RSRP resource configuration indicates one or more SRS-RSRP resources on which the UE is to perform CLI measurement operations, and the method further includes performing one or more CLI measurements on the one or more SRS-RSRP resources, the determination of the CLI value being based on the one or more CLI measurements.

In a sixth aspect, alone or in combination with one or more of the first through fifth aspects, the AoA estimation configuration information includes at least one of AoA resource information, AoA reporting information, or AoA type information.

In a seventh aspect, alone or in combination with one or more of the first through sixth aspects, the AoA estimation configuration information is associated with a single SRS-RSRP resource, and determining the AoA value includes: performing a single AoA estimation operation on the single SRS-RSRP resource.

In an eighth aspect, alone or in combination with one or more of the first through seventh aspects, the AoA estimation configuration information is associated with a set of SRS-RSRP resources, and determining the AoA value includes: determining an SRS-RSRP resource of the set of SRS-RSRP resources; and performing an AoA estimation operation on the determined SRS-RSRP resource of the set.

In a ninth aspect, alone or in combination with one or more of the first through eighth aspects, the AoA estimation configuration information is associated with a set of SRS-RSRP resources, and determining the AoA value includes: determining a plurality of SRS-RSRP resources of the set of SRS-RSRP resources; and performing an AoA estimation operation for each determined SRS-RSRP resource of the plurality of SRS-RSRP resources, each AoA estimation operation performed with a different beam.

In a tenth aspect, alone or in combination with one or more of the first through ninth aspects, performing the AoA estimation operations include: performing, for each of the AoA estimation operations, a receiver beam sweep at a respective angle for a respective SRS-RSRP resource of the plurality of SRS-RSRP resources.

In an eleventh aspect, alone or in combination with one or more of the first through tenth aspects, the CLI resource configuration information and the AoA estimation configuration information are received in separate transmissions from the network entity.

In a twelfth aspect, alone or in combination with one or more of the first through eleventh aspects, receiving the AoA estimation configuration information includes receiving a CLI resource configuration message that includes the resource configuration information and at least a portion of the AoA estimation configuration information.

In a thirteenth aspect, alone or in combination with one or more of the first through twelfth aspects, receiving the AoA estimation configuration information includes receiving a plurality of messages from the network entity, each of the plurality of messages including at least one of RRC signaling, a MAC-CE, or DCI that includes a portion of the AoA estimation configuration information.

In a fourteenth aspect, alone or in combination with one or more of the first through thirteenth aspects, the CLI resource configuration information and the AoA estimation configuration information are received in a same transmission from the network entity.

In a fifteenth aspect, alone or in combination with one or more of the first through fourteenth aspects, transmitting the CLI report data and the AoA report data includes transmitting a combined report message that includes the CLI report data and the AoA report data.

In a sixteenth aspect, alone or in combination with the fifteenth aspect, the combined report message is a CLI report.

In a seventeenth aspect, alone or in combination with one or more of the first through sixteenth aspects, transmitting the CLI report data and the AoA report data includes transmitting a first report message that includes the CLI report data and a second report message that includes the AoA report data.

In an eighteenth third aspect, alone or in combination with one or more of the first through seventeenth aspects, transmitting the AoA report data includes transmitting a PUSCH transmission including an AoA report that includes the AoA report data.

In a nineteenth aspect, alone or in combination with one or more of the first through eighteenth aspects, the AoA report data is configured based on a configured SRS-RSRP resource indicated by the CLI resource configuration information.

In a twentieth aspect, alone or in combination with one or more of the first through nineteenth aspects, the AoA report data is configured based on a configured sounding SRS-RSRP resource set indicated by the CLI resource configuration information.

In some aspects, an apparatus configured for wireless communication, such as a base station, is configured to: transmit, to a UE, CLI resource configuration information and AoA estimation configuration information; receive, from the UE, CLI report data indicating a CLI value for CLI at the UE associated with an uplink transmission transmitted by another UE; receive, from the UE, AoA report data indicating an estimated AoA value associated with the CLI, the AoA value corresponding to an estimated AoA at the UE associated with the uplink transmission transmitted by the other UE; determine a position of the UE based on the AoA report data; and determine a CLI mitigation adjustment based on the CLI report data, the CLI mitigation adjustment indicative of a configuration associated with the UE to reduce or eliminate the CLI associated with the uplink transmission transmitted by the other UE. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In an twenty-first aspect, the network entity is operating in a millimeter wave spectrum.

In a twenty-second aspect, alone or in combination with the twenty-first aspect, the network entity is operating in sub-6 gigahertz spectrum.

In a twenty-third aspect, alone or in combination with one or more of the twenty-first through twenty-second aspects, the estimated AoA value indicates an angle offset from a reference direction defined by a GCS.

In a twenty-fourth aspect, alone or in combination with one or more of the twenty-first through twenty-third aspects, the estimated AoA value indicates an angle offset from a reference direction defined by a LCS, and the AoA report data further includes a set of conversion angles to convert from the LCS to another coordinate system.

In a twenty-fifth aspect, alone or in combination with one or more of the twenty-first through twenty-fourth aspects, transmitting the CLI configuration information includes transmitting the CLI configuration indicating a CLI SRS-RSRP resource configuration, and the SRS-RSRP resource configuration indicates one or more SRS-RSRP resources on which the UE is to perform CLI measurement operations.

In a twenty-sixth aspect, alone or in combination with one or more of the twenty-first through twenty-fifth aspects, the AoA estimation configuration information includes at least one of AoA resource information, AoA reporting information, or AoA type information.

In a twenty-seventh aspect, alone or in combination with one or more of the twenty-first through twenty-sixth aspects, the AoA estimation configuration information is associated with one SRS-RSRP resource, and the estimated AoA value corresponds to a single AoA estimation operation for the one SRS-RSRP.

In a twenty-eighth aspect, alone or in combination with one or more of the twenty-first through twenty-seventh aspects, the AoA estimation configuration information is associated with a set of SRS-RSRP resources, and the estimated AoA value corresponds to an AoA value for a particular SRS-RSRP resource of the set.

In a twenty-ninth aspect, alone or in combination with one or more of the twenty-first through twenty-eighth aspects, the AoA estimation configuration information is associated with a set of SRS-RSRP resources, and the estimated AoA value corresponds to a single AoA value for SRS-RSRP resources of the set.

In a thirtieth aspect, alone or in combination with one or more of the twenty-first through twenty-ninth aspects, transmitting the CLI resource configuration information and the AoA estimation configuration information includes transmitting the CLI resource configuration information and the AoA estimation configuration information in separate transmissions.

In a thirty-first aspect, alone or in combination with one or more of the twenty-first through thirtieth aspects, transmitting the CLI resource configuration information and the AoA estimation configuration information includes transmitting a CLI resource configuration message that includes the resource configuration information and at least a portion of the AoA estimation configuration information.

In a thirty-second aspect, alone or in combination with one or more of the twenty-first through thirty-first aspects, transmitting the CLI resource configuration information and the AoA estimation configuration information includes transmitting a plurality of messages, each of the plurality of messages including at least one of RRC signaling, a MAC-CE, or DCI that includes a portion of the AoA estimation configuration information.

In a thirty-third aspect, alone or in combination with one or more of the twenty-first through thirty-second aspects, transmitting the CLI resource configuration information and the AoA estimation configuration information includes transmitting the CLI resource configuration information and the AoA estimation configuration information in a same transmission.

In a thirty-fourth aspect, alone or in combination with one or more of the twenty-first through thirty-third aspects, receiving the CLI report data and receiving the AoA report data includes receiving a combined report message that includes the CLI report data and the AoA report data.

In a thirty-fifth aspect, alone or in combination with one or more of the twenty-first through thirty-fourth aspects, the combined report message is a CLI report.

In a thirty-sixth aspect, alone or in combination with one or more of the twenty-first through thirty-fifth aspects, receiving the CLI report data and receiving the AoA report data includes receiving a first report message that includes the CLI report data and a second report message that includes the AoA report data.

In a thirty-seventh aspect, alone or in combination with one or more of the twenty-first through thirty-sixth aspects, receiving the AoA report data includes receiving a PUSCH transmission including an AoA report that includes the AoA report data.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication by a user equipment (UE), comprising:
   receiving, from a network entity, cross-link interference (CLI) resource configuration information and angle-of-arrival (AoA) estimation configuration information;
   receiving CLI associated with an uplink transmission transmitted by another UE;
   determining a CLI value for the CLI based on the CLI resource configuration information;
   determining an AoA value associated with the CLI based on the AoA estimation configuration information, the AoA value corresponding to an estimated AoA at the UE associated with the uplink transmission transmitted by the other UE; and
   transmitting CLI report data indicating the determined CLI value and AoA report data indicating the AoA value.

2. The method of claim 1, wherein the UE is operating in a millimeter wave spectrum, and wherein the UE has multiple antenna panels.

3. The method of claim 1, wherein the UE is operating in sub-6 gigahertz spectrum, and wherein the UE has multiple receive antennas.

4. The method of claim 1, wherein the AoA value indicates an angle offset from a reference direction defined by a Global Coordinate System (GCS).

5. The method of claim 1, wherein the AoA value indicates an angle offset from a reference direction defined by a Local Coordinate System (LCS), and wherein the AoA report data further includes a set of conversion angles to convert from the LCS to another coordinate system.

6. The method of claim 1, wherein the CLI resource configuration information indicates a CLI sounding reference signal (SRS) reference signal receive power (RSRP) (SRS-RSRP) resource configuration, wherein the SRS-RSRP resource configuration indicates one or more SRS-RSRP resources on which the UE is to perform CLI measurement operations, and wherein the method further comprises:
   performing one or more CLI measurements on the one or more SRS-RSRP resources, the determination of the CLI value being based on the one or more CLI measurements.

7. The method of claim 1, wherein the AoA estimation configuration information includes at least one of AoA resource information, AoA reporting information, or AoA type information.

8. The method of claim 1, wherein the AoA estimation configuration information is associated with a single sounding reference signal (SRS) reference signal receive power (RSRP) (SRS-RSRP) resource, and wherein determining the AoA value includes:
   performing a single AoA estimation operation on the single SRS-RSRP resource.

9. The method of claim 1, wherein the AoA estimation configuration information is associated with a set of sounding reference signal (SRS) reference signal receive power (RSRP) (SRS-RSRP) resources, and wherein determining the AoA value includes:
   determining an SRS-RSRP resource of the set of SRS-RSRP resources; and performing an AoA estimation operation on the determined SRS-RSRP resource.

10. An apparatus configured for wireless communication, comprising:
 at least one processor; and
 a memory coupled to the at least one processor,
 wherein the at least one processor is configured to:
  receive, from a network entity, cross-link interference (CLI) resource configuration information and angle-of-arrival (AoA) estimation configuration information;
  receive CLI associated with an uplink transmission transmitted by another device;
  determine a CLI value for the CLI based on the CLI resource configuration information;
  determine an AoA value associated with the CLI based on the AoA estimation configuration information, the AoA value corresponding to an estimated AoA at the apparatus associated with the uplink transmission transmitted by the other device; and
  transmit CLI report data indicating the determined CLI value and AoA report data indicating the AoA value.

11. The apparatus of claim 10, wherein the AoA estimation configuration information is associated with a set of sounding reference signal (SRS) reference signal receive power (RSRP) (SRS-RSRP) resources, and wherein the processor configured to determine the AoA value comprises the processor configured to:
 determine a plurality of SRS-RSRP resources of the set of SRS-RSRP resources; and
 perform an AoA estimation operation for each determined SRS-RSRP resource of the plurality of SRS-RSRP resources, each AoA estimation operation performed with a different beam.

12. The apparatus of claim 11, wherein the processor configured to perform the AoA estimation operations comprises the processor configured to:
 perform, for each of the AoA estimation operations, a receiver beam sweep at a respective angle for a respective SRS-RSRP resource of the plurality of SRS-RSRP resources.

13. The apparatus of claim 10, wherein the CLI resource configuration information and the AoA estimation configuration information are received in separate transmissions from the network entity.

14. The apparatus of claim 10, wherein the processor configured to receive the AoA estimation configuration information comprises the processor configured to:
 receive a CLI resource configuration message that includes the resource configuration information and at least a portion of the AoA estimation configuration information.

15. The apparatus of claim 10, wherein the CLI resource configuration information and the AoA estimation configuration information are received in a same transmission from the network entity.

16. The apparatus of claim 10, wherein the processor configured to transmit the CLI report data and the AoA report data comprises the processor configured to:
 transmit a combined report message that includes the CLI report data and the AoA report data.

17. The apparatus of claim 16, wherein the combined report message is a CLI report.

18. An apparatus configured for wireless communication, comprising:
 means for receiving, from a network entity, cross-link interference (CLI) resource configuration information and angle-of-arrival (AoA) estimation configuration information;
 means for receiving CLI associated with an uplink transmission transmitted by another device;
 means for determining a CLI value for the CLI based on the CLI resource configuration information;
 means for determining an AoA value associated with the CLI based on the AoA estimation configuration information, the AoA value corresponding to an estimated AoA at the apparatus associated with the uplink transmission transmitted by the other device; and
 means for transmitting CLI report data indicating the determined CLI value and AoA report data indicating the AoA value.

19. The apparatus of claim 18, wherein the means for transmitting the CLI report data and the AoA report data comprises means for transmitting a first report message that includes the CLI report data and a second report message that includes the AoA report data.

20. The apparatus of claim 19, wherein the means for transmitting the AoA report data comprises means for transmitting a physical uplink shared channel (PUSCH) transmission including an AoA report that includes the AoA report data.

21. The apparatus of claim 19, wherein the AoA report data is configured based on a configured sounding reference signal (SRS) reference signal receive power (RSRP) (SRS-RSRP) resource indicated by the CLI resource configuration information.

22. The apparatus of claim 19, wherein the AoA report data is configured based on a configured sounding reference signal (SRS) reference signal receive power (RSRP) (SRS-RSRP) resource set indicated by the CLI resource configuration information.

23. A method of wireless communication by a network entity, comprising:
 transmitting, to a user equipment (UE), cross-link interference (CLI) resource configuration information and angle-of-arrival (AoA) estimation configuration information;
 receiving, from the UE, CLI report data indicating a CLI value for CLI at the UE associated with an uplink transmission transmitted by another UE;
 receiving, from the UE, AoA report data indicating an estimated AoA value associated with the CLI, the estimated AoA value corresponding to an estimated AoA at the UE associated with the uplink transmission transmitted by the other UE;
 determining a position of the UE based on the AoA report data; and
 determining a CLI mitigation adjustment based on the CLI report data, the CLI mitigation adjustment indicative of a configuration associated with the UE to reduce or eliminate the CLI associated with the uplink transmission transmitted by the other UE.

24. The method of claim 23, wherein transmitting the CLI resource configuration information comprises transmitting the CLI resource configuration information indicating a CLI sounding reference signal (SRS) reference signal receive power (RSRP) (SRS-RSRP) resource configuration, and wherein the SRS-RSRP resource configuration indicates one or more SRS-RSRP resources on which the UE is to perform CLI measurement operations.

25. The method of claim 23, wherein the AoA estimation configuration information includes at least one of AoA resource information, AoA reporting information, or AoA type information.

26. The method of claim 23, wherein the AoA estimation configuration information is associated with one sounding reference signal (SRS) reference signal receive power (RSRP) (SRS-RSRP) resource, and wherein the estimated AoA value corresponds to a single AoA estimation operation for the one SRS-RSRP.

27. The method of claim 23, wherein the AoA estimation configuration information is associated with a set of sounding reference signal (SRS) reference signal receive power (RSRP) (SRS-RSRP) resources, and wherein the estimated AoA value corresponds to an AoA value for a particular SRS-RSRP resource of the set.

28. The method of claim 23, wherein the AoA estimation configuration information is associated with a set of sounding reference signal (SRS) reference signal receive power (RSRP) (SRS-RSRP) resources, and wherein the estimated AoA value corresponds to a single AoA value for SRS-RSRP resources of the set.

29. An apparatus configured for wireless communication, comprising:
at least one processor; and
a memory coupled to the at least one processor,
wherein the at least one processor is configured to:
transmit, to a user equipment (UE), cross-link interference (CLI) resource configuration information and angle-of-arrival (AoA) estimation configuration information;
receive, from the UE, CLI report data indicating a CLI value for CLI at the UE associated with an uplink transmission transmitted by another UE;
receive, from the UE, AoA report data indicating an estimated AoA value associated with the CLI, the estimated AoA value corresponding to an estimated AoA at the UE associated with the uplink transmission transmitted by the other UE;
determine a position of the UE based on the AoA report data; and
determine a CLI mitigation adjustment based on the CLI report data, the CLI mitigation adjustment indicative of a configuration associated with the UE to reduce or eliminate the CLI associated with the uplink transmission transmitted by the other UE.

30. The apparatus of claim 29, wherein the processor configured to transmit the CLI resource configuration information and the AoA estimation configuration information comprises the processor configured to:
transmit the CLI resource configuration information and the AoA estimation configuration information in separate transmissions.

31. The apparatus of claim 29, wherein the processor configured to transmit the CLI resource configuration information and the AoA estimation configuration information comprises the processor configured to:
transmit a CLI resource configuration message that includes the resource configuration information and at least a portion of the AoA estimation configuration information.

32. The apparatus of claim 29, wherein the processor configured to transmit the CLI resource configuration information and the AoA estimation configuration information comprises the processor configured to:
transmit a plurality of messages, each of the plurality of messages including at least one of radio resource control (RRC) signaling, a medium access control (MAC) control element (MAC-CE), or downlink control information (DCI) that includes a portion of the AoA estimation configuration information.

33. The apparatus of claim 29, wherein the processor configured to transmit the CLI resource configuration information and the AoA estimation configuration information comprises the processor configured to:
transmit the CLI resource configuration information and the AoA estimation configuration information in a same transmission.

34. The apparatus of claim 29, wherein the processor configured to receive the CLI report data and receive the AoA report data comprises the processor configured to:
receive a combined report message that includes the CLI report data and the AoA report data.

35. The apparatus of claim 29, wherein the processor configured to receive the CLI report data and receive the AoA report data comprises the processor configured to:
receive a first report message that includes the CLI report data and a second report message that includes the AoA report data.

* * * * *